(12) United States Patent
Johnston et al.

(10) Patent No.: US 11,284,225 B2
(45) Date of Patent: *Mar. 22, 2022

(54) MOBILE DEVICE COMMUNICATION SYSTEM

(71) Applicant: Viva Capital Series LLC, BT Series, Las Vegas, NV (US)

(72) Inventors: David Johnston, Murrieta, CA (US); Ryan A. Bis, Farmington, CT (US)

(73) Assignee: Viva Capital Series LLC, BT Series, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,775

(22) Filed: Aug. 19, 2020

(65) Prior Publication Data

US 2021/0211847 A1 Jul. 8, 2021

Related U.S. Application Data

(63) Continuation of application No. 16/575,264, filed on Sep. 18, 2019, now Pat. No. 10,779,133, which is a continuation of application No. 15/999,436, filed on Aug. 20, 2018, now Pat. No. 10,455,376, which is a continuation of application No. 15/207,209, filed on Jul. 11, 2016, now Pat. No. 10,057,733, which is a continuation of application No. 14/037,243, filed on Sep. 25, 2013, now Pat. No. 9,420,437.

(60) Provisional application No. 61/705,624, filed on Sep. 25, 2012.

(51) Int. Cl.
*H04W 4/12* (2009.01)
*H04W 4/08* (2009.01)

(52) U.S. Cl.
CPC .............. *H04W 4/12* (2013.01); *H04W 4/08* (2013.01)

(58) Field of Classification Search
CPC ...... G06Q 10/107; G06Q 10/10; G06F 17/21; G06F 17/27; G06F 17/2745; G06F 17/28; G06F 17/30867
See application file for complete search history.

(56) References Cited

U.S. PATENT DOCUMENTS

| 6,505,167 | B1 * | 1/2003 | Horvitz ................ G06Q 10/109 705/7.21 |
| 6,816,885 | B1 * | 11/2004 | Raghunandan ......... H04L 51/12 709/206 |
| 6,993,326 | B2 | 1/2006 | Link, II et al. |
| 7,299,261 | B1 * | 11/2007 | Oliver .................. G06Q 10/107 709/206 |

(Continued)

FOREIGN PATENT DOCUMENTS

| EP | 2586220 A1 | 5/2013 |
| WO | 2008027750 A2 | 3/2008 |

(Continued)

*Primary Examiner* — Dung Hong
(74) *Attorney, Agent, or Firm* — Howard & Howard Attorneys PLLC

(57) ABSTRACT

Representative implementations of devices and techniques provide a system for communicating with a plurality of mobile devices from a single mobile device. Source information may be stored from an incoming message to one or more groups. An outgoing message may be associated to each of the groups, and may be automatically sent to one or more of the groups based on user-defined rules.

20 Claims, 22 Drawing Sheets

(56) References Cited

U.S. PATENT DOCUMENTS

| | | | |
|---|---|---|---|
| 7,386,595 B1 * | 6/2008 | Bloomer, Jr | G06Q 10/107 709/203 |
| 8,249,920 B2 | 8/2012 | Smith | |
| 8,442,563 B2 | 5/2013 | Chen et al. | |
| 8,515,972 B1 * | 8/2013 | Srikrishna | G06F 16/3322 707/750 |
| 9,420,437 B2 * | 8/2016 | Johnston | H04W 4/12 |
| 10,455,376 B2 * | 10/2019 | Johnston | H04W 4/12 |
| 10,779,133 B2 * | 9/2020 | Johnston | H04W 4/12 |
| 2003/0006911 A1 | 1/2003 | Smith et al. | |
| 2004/0093284 A1 * | 5/2004 | Takaoka | G06Q 30/02 705/26.4 |
| 2005/0060643 A1 * | 3/2005 | Glass | G06F 40/169 715/205 |
| 2005/0097174 A1 * | 5/2005 | Daniell | H04L 51/12 709/206 |
| 2006/0053490 A1 | 3/2006 | Herz et al. | |
| 2006/0067502 A1 | 3/2006 | Bamrah et al. | |
| 2006/0212561 A1 * | 9/2006 | Feng | H04L 63/0227 709/223 |
| 2007/0156895 A1 | 7/2007 | Vuong | |
| 2008/0086360 A1 | 4/2008 | Kanapur et al. | |
| 2008/0281927 A1 * | 11/2008 | Vanderwende | G06Q 10/107 709/206 |
| 2009/0228557 A1 * | 9/2009 | Ganz | G06Q 10/107 709/206 |
| 2009/0305676 A1 * | 12/2009 | Zhang | G06Q 10/107 455/412.1 |
| 2010/0057720 A1 * | 3/2010 | Kalyan | G06F 16/337 707/E17.017 |
| 2011/0053618 A1 * | 3/2011 | Lin | H04L 51/38 455/466 |
| 2011/0202620 A1 * | 8/2011 | Wang | H04L 51/12 709/206 |
| 2012/0028606 A1 * | 2/2012 | Bobotek | H04L 51/28 455/411 |
| 2012/0254333 A1 * | 10/2012 | Chandramouli | G06N 5/04 709/206 |
| 2013/0066984 A1 | 3/2013 | Shin | |
| 2013/0143608 A1 * | 6/2013 | Lin | G06F 16/35 455/466 |
| 2013/0282841 A1 * | 10/2013 | Bates | H04L 51/12 709/206 |
| 2013/0290339 A1 * | 10/2013 | LuVogt | G06Q 10/10 707/740 |
| 2013/0290447 A1 * | 10/2013 | Leeds | H04L 51/12 709/206 |
| 2014/0012924 A1 | 1/2014 | Jagernauth | |

FOREIGN PATENT DOCUMENTS

| | | |
|---|---|---|
| WO | 2008140911 A1 | 11/2008 |
| WO | 2009051503 A2 | 4/2009 |
| WO | 2011035442 A1 | 3/2011 |

* cited by examiner

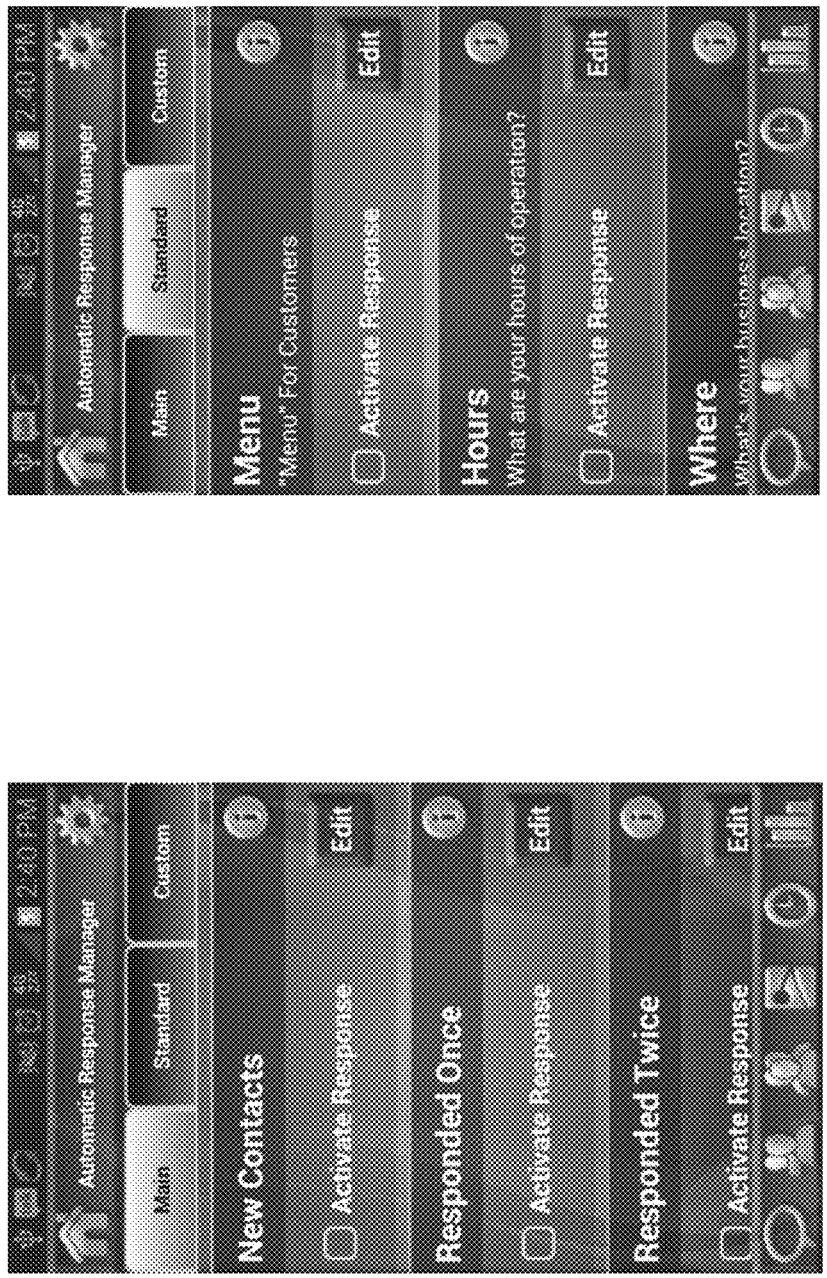

MOBILE DEVICE COMMUNICATION SYSTEM

CROSS-REFERENCE TO RELATED APPLICATION

This application is a continuation of U.S. patent application Ser. No. 16/575,264, filed Sep. 18, 2019, which is a continuation of U.S. patent application Ser. No. 15/999,436, filed Aug. 20, 2018 (now U.S. Pat. No. 10,455,376, issued Oct. 22, 2019), which is a continuation of U.S. patent application Ser. No. 15/207,209, filed Jul. 11, 2016 (now U.S. Pat. No. 10,057,733, issued Aug. 21, 2018), which is a continuation of U.S. patent application Ser. No. 14/037,243, filed Sep. 25, 2013 (now U.S. Pat. No. 9,420,437, issued Aug. 16, 2016), which claims the benefit of U.S. Provisional Application No. 61/705,624, filed Sep. 25, 2012, the disclosures of which are hereby incorporated by reference in their entirety.

BACKGROUND

Mass text messaging, including managing contacts, and sending and receiving messages in bulk based on rule sets, is often conducted via server-based systems such as server-based holding, processing, sending and receiving systems. This includes mass texting services that are accessed via a mobile application ("app") loaded on a mobile device. While the app on the mobile device may provide a user interface for accessing messages or initiating the sending of messages, the actual message sending is accomplished at the hardware and software of a remote server.

In typical server-based systems, the gateway system is ubiquitous. Most or all of the decision making, application of rules, and other processing does not take place on a mobile device, but at the server. Additionally, a text message may not be actually sent through the native hardware of the device, but from the server. Alternatives to this approach have been considered unintelligent due to the difficulties caused by hardware restrictions, limitations and other technical issues inherent in mobile devices.

Additionally, mobile devices in many server-based systems often rely on a connection to the Internet. The mobile devices upload messages to the servers with instructions as to what the server should do with the messages (e.g., how and where to deliver them, etc.). In most cases the instructions ask the server to deliver the messages to a major telco carrier's server. The major carrier can often choose whether to deliver the messages or not. This results in a low confidence level for a user desiring to send a mass message campaign.

Small to medium-sized businesses have often been unable to participate in mass messaging campaigns due to the high costs of participating. For example, many businesses do not have the required budget and capability to use and operate established computer and web-based gateway text messaging systems. This includes the many businesses that do not have on-site computer or internet access available to staff for various reasons. The result is the inability of these businesses to establish and nurture a profitable level of relationship with their customers/prospects.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

FIGS. 12-32 illustrate example user interface configurations and associated functionality, of a mobile device running an implementation of a communication system mobile application.

DETAILED DESCRIPTION

Introduction

Figure 1:
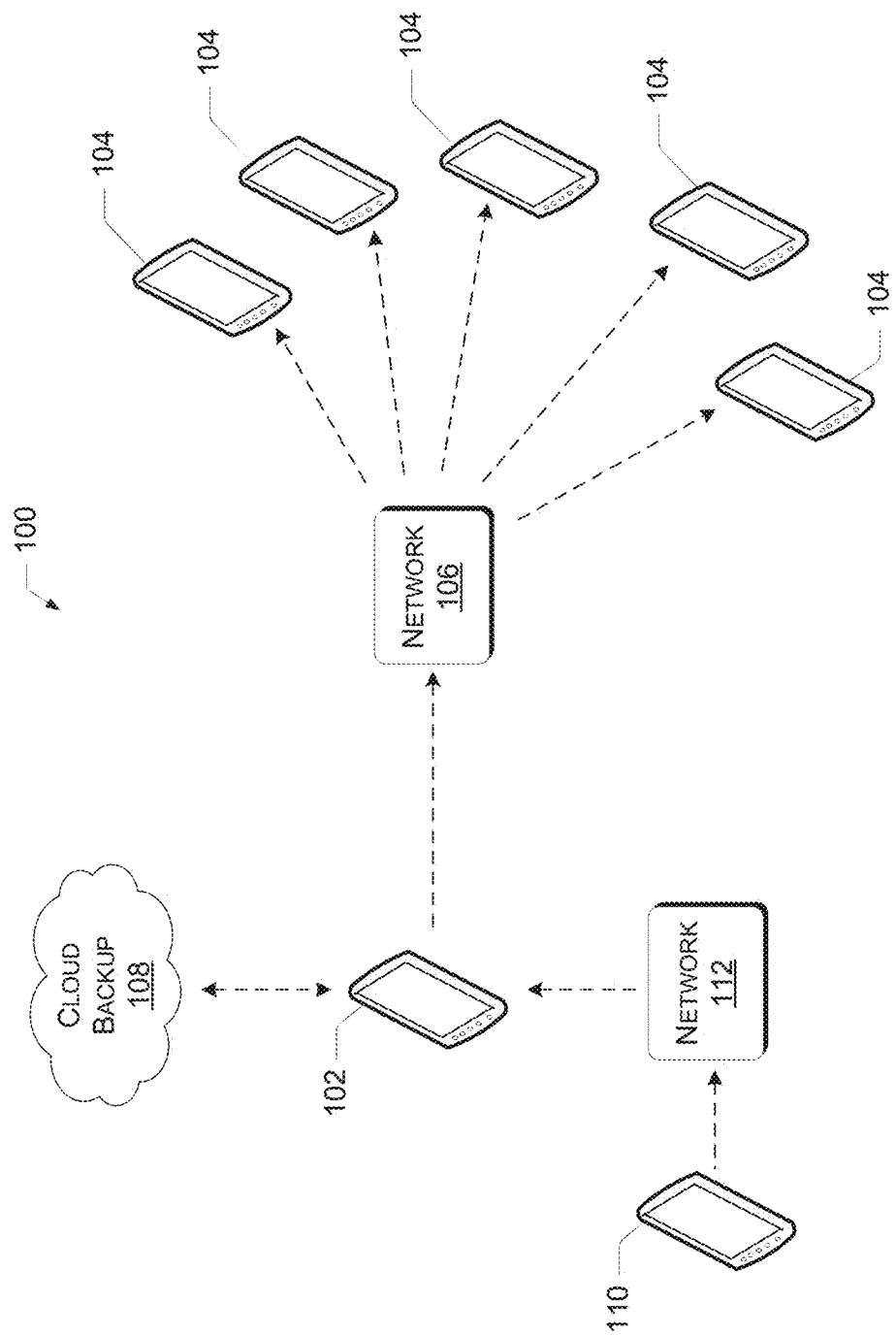
FIG. 1 is a diagram of an exemplary environment for a communication system, according to an example embodiment.

This disclosure describes a "one-to-many" text message communications arrangement, on a mass scale, for example, using mobile devices. It includes using an app (e.g., mobile application) on a mobile device that acts as a communications server or platform uniquely hosted natively on the mobile device. The arrangement can enhance or entirely supplant known texting systems, for example.

The arrangement utilizes techniques for receiving, processing and initiating the transmission of text messages from a mobile device, in contrast to being processed, initiated, and the like, from internet-based connections, from or through traditional "computer terminals," "web based systems," "mobile terminals," or other non-hand-held devices (like SMS or MMS gateways or servers, for example).

Representative implementations of devices and techniques provide a system for communicating with a plurality of mobile devices from a single mobile device. For example, the single mobile device may participate in a mass messaging campaign, sending text or multi-media messages to a large number (e.g., 20,000+) of customers and/or prospects.

When the single mobile device receives an incoming message from a customer or prospect ("customer"), source information from the incoming message may be categorized (e.g., grouped into one or more groups) and stored in the memory of the single mobile device. An outgoing message (stored in the memory of the single mobile device) may be associated to each of the groups, and may be automatically sent to one or more of the groups based on user-defined rules. In an implementation, all of the processes, from storing information regarding the incoming message to sending a mass communication to one or more groups, is automatic. That is, they are performed without requiring any human intervention or interaction.

Further, in an implementation, the user may define, determine, and/or adjust many or all of the rules, groups, and/or processes, or properties of the same, from a user interface on the mobile device.

In an implementation, the communication system utilizes a mobile device (such as a smartphone, tablet device, or the like) that sends messages using the cellular data of a major carrier network. The mobile device handles all the logic, rules, storage methods, procedures, filters, and algorithms from within the device, using native hardware, touch screen, mobile buttons, and so forth.

In an implementation, the communication system includes a mobile application ("app"), which comprises a software application that may be installed on a mobile device such as a smartphone, tablet device, and the like. The app is run on a processor of the mobile device, and works in conjunction with the operating system of the mobile device to access the memory of the mobile device and various hardware components (such as the transceiver, for instance) to send messages to a plurality of other mobile devices more or less at the same time.

In an implementation, the app has the ability to automatically and autonomously manage contacts and track interactions with those contacts. It can automatically answer questions (Autoresponder), send sequential follow ups over a period of time (Drip Campaigns), schedule specific time and date for future messages to individuals or groups (Scheduled Follow ups), send recurring messages based on the day of the week (Daily Messages), automatically group contacts based on interactions (Auto List Segmentation), and understand when someone doesn't want to be texted anymore and remove them from the system (Opt-Out Management). These and additional features will be described below.

In one example implementation, the communication system is arranged to communicate with a plurality of mobile devices from a single mobile device. In the implementation, the communication system comprises a processor of the single mobile device, a memory coupled to the processor, a mobile application component including processor-executable instructions stored in the memory and operable on the processor to: store source information of a received incoming message to one or more groups, based on a content of the incoming message, the one or more groups stored in the memory of the single mobile device; select an outgoing message from a plurality of outgoing messages stored in the memory of the single mobile device for each of the one or more groups; and automatically send a communication including the outgoing message from the single mobile device to the plurality of mobile devices, the plurality of mobile devices associated to at least one group of the one or more groups, according to a user-defined rule associated with the at least one group.

In another implementation, the mobile device comprises: a processor; a memory coupled to the processor; a mobile application component including processor-executable instructions stored in the memory and operable on the processor to: analyze an incoming message for source information and content; and when the source information of the incoming message indicates an executive entity and a predetermined code is present in the content, automatically forward the incoming message to a plurality of mobile devices, the plurality of mobile devices associated to at least one group of a plurality of groups stored in the memory, according to a predetermined rule associated with the at least one group and/or the content of the incoming message.

In an implementation, the processor-executable instructions are operable on the processor to "include" a mobile device associated with a source of the incoming message in communications sent to the one or more groups, based on the content of the incoming message. In another implementation, the processor-executable instructions are operable on the processor to "exclude" a mobile device associated with a source of the incoming message from communications sent to the one or more groups, based on the content of the incoming message. In one implementation, the processor-executable instructions are operable on the processor to remove the source information from the memory of the single mobile device when the content of the incoming message indicates an opt-out from any further communications.

In an implementation, the processor-executable instructions are operable on the processor to automatically send another communication from the single mobile device to the plurality of mobile devices based on a predetermined time duration since sending a previous communication, a keyword included in the incoming message, and/or the occurrence of a predetermined day.

Techniques and devices are discussed with reference to example mobile devices and systems illustrated in the figures. However, this is not intended to be limiting, and is for ease of discussion and illustrative convenience. The techniques and devices discussed may be applied to many of various communication device designs, types, and the like, and remain within the scope of the disclosure. In alternate implementations, the communication system may be employed in other ways or with other devices, systems, or the like.

The following definitions are used and applied within the context of this disclosure. Equivalent terms and definitions are also within the scope of the disclosure.

"User" includes but is not limited to the individual or business operating a mobile app or network of mobile apps on a mobile device.

"Customer" includes any party who receives a text message from a User via the mobile app or who sends a text message into the system or who is otherwise a contact in the mobile device. Customers may include prospects and/or parties of interest, as well as registered users and the like.

"Mobile Device(s)" includes but are not limited to smartphones, tablets, smart TV's, set-top boxes, etc. and other mobile devices.

"App" includes but is not limited to meaning a software application typically used on mobile devices. Generally, apps are available through app stores such as Apple's iTunes®, Google's Play Store®, Microsoft's App Store™, Blackberry®, and so forth. Apps are usually run on mobile-based operating systems running on iPhones®, iPads®, Android® Phones, Android® Tablets, Apple TV®, Google TV®, and many other similar devices.

"Text Message" or "text" includes but is not limited to various text-based, image-based, media-based, etc. messages communicated using protocols for sending and receiving "native" text messages via SMS, MMS, EMS, etc., that are primarily used on mobile devices and the like.

"OTT" (Over-the-top content) includes but is not limited to sending messages (such as text messages, etc.) via WiFi, 2G, 3G, 4G, 4G LTE, LAN, Broadband, Dialup, or other wireless or internet connections.

"Keywords" include but are not limited to alphanumeric characters, subsets thereof, symbols, or other characters commonly available to a user on a computer, phone or other mobile device. They can include any combination of characters in the form of words, phrases, codes, sentences, or even paragraphs. Typos, acronyms, abbreviations, and text message slang may be included as keywords.

"Major Carrier(s)" includes but is not limited to Verizon™, AT&T™, Sprint™, T-Mobile™, etc., and all other cellular telephone network carriers.

The terms, descriptions, examples, and so forth used herein are intended to include any similar code, methods, descriptions, systems, or software; and such falls within the scope of the disclosure herein. All language in plurality shall cover the singular and masculine share cover feminine and vice versa. Use of commercial terms or examples in this document shall not be interpreted as a limitation of invention or its use.

Implementations are explained in more detail below using a plurality of examples. Although various implementations and examples are discussed here and below, further implementations and examples may be possible by combining the features and elements of individual implementations and examples.

Advantages

The embodiments described herein provide a number of advantages. One of the many advantages of this arrangement is to provide small to medium sized businesses with the ability to have a fully managed, semi-automated, professional text message marketing system using machine learning and other features, making the app smart or intelligent. Examples of commercial industry use could be in marketing and advertising, medical field, health and beauty, service industry, hospitality and many others. It could also be used in noncommercial settings by news organizations, first responders, disaster warning organizations, schools, churches, non-profits, sports teams, celebrities, social gurus, etc. etc.

The system 100 has the technical ability to provide follow-up customer service communications, reminders, specials, and other solicitations on a semi-automated cost effective basis. This empowers users with an effective level of mass communication with customers, prospects, staff, peers, etc. etc. It also provides businesses with the benefit of offering "geo location" marketing specials and deals based on supplies, inventory and other circumstances that require these business locations to be able to offer deals specific to their particular circumstances.

In addition it allows franchise companies to use local phone numbers for their local stores. They can conduct "by location" based marketing campaigns via that location or through the forwarding system from corporate to the location based smartphones, tablets or other mobile devices.

Example Environment

As shown in FIG. 1, an example environment is illustrated for a communication system 100, according to an embodiment. In an implementation, an example communication system 100 includes a single mobile device ("mobile device") 102. The mobile device 102 may be activated to a network 106, along with multiple other mobile devices 104. In alternate embodiments, the network 106 represents a single network having a single carrier/operator and a single technology, or a combination of interconnected networks having a plurality of carriers/operators and a plurality of technologies (e.g., such as the typical cellular environment—that includes many carriers/operators and many technologies (GSM, CDMA, TDMA, etc.) that are able to communicate with each other).

In an alternate implementation, the network 106 is arranged such that devices 102 and 104 can communicate with each other, using one or more technologies including WiFi, 2G, 3G, 4G, 4G LTE, LAN, WAN, broadband, dialup, or other wireless or Internet connections, or combinations of the same.

As illustrated in FIG. 1, the communication system 100 may include a cloud backup service 108 arranged to back up data (including contacts, customer information, and the like) from the mobile device 102 to a remote storage device. In the implementation, the cloud backup service 108 may be arranged to restore data onto the mobile device 102 in the event of a catastrophic failure, or the like.

Further, the communication system 100 may include an executive mobile device 110 arranged to sent communications to the mobile device 102 via a network 112 (which may or may not be the same network as network 106) that are intended to be forwarded to the other mobile devices 104. In various implementations, the executive mobile device 110 may be controlled by an executive entity (e.g., a corporate entity, a franchise headquarters, an administrative lead), or the like.

In alternate implementations, a communication system 100 may include fewer components, additional components, or alternate components to perform the functions discussed, or for other desired functionality.

Example Mobile Device

Figure 2:
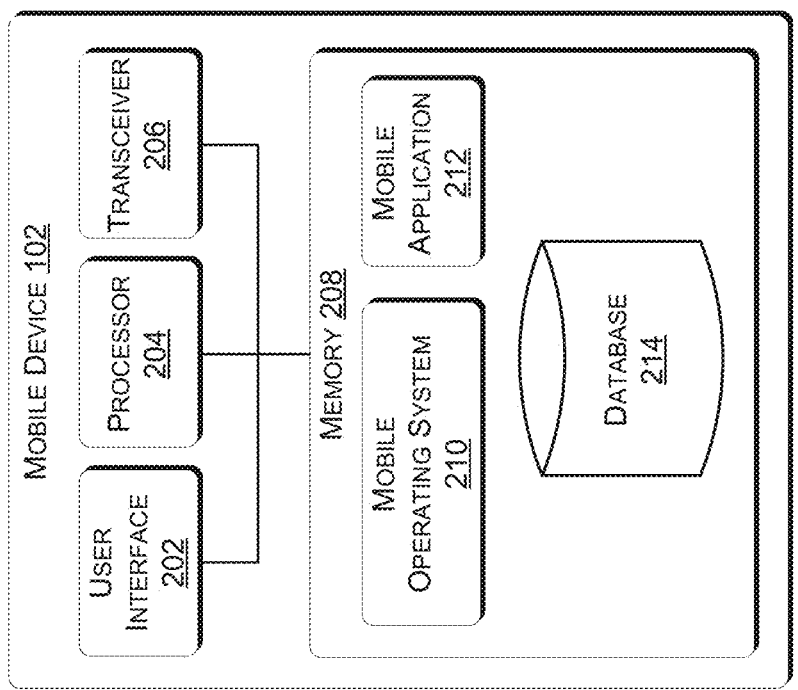
FIG. 2 is a block diagram of an example mobile device, according to an embodiment.

FIG. 2 is a block diagram of an example mobile device 102, according to an embodiment. In various implementations, the mobile device 102 may include one of many types and designs of mobile devices capable of receiving and sending messages (such as text messages, multimedia messaging service (MMS) messages, enhanced messaging service (EMS) messages, short message service (SMS) messages, and the like). In the implementations, the mobile device 102 may comprise such devices including, but not limited to: a mobile phone, a smart phone, a tablet device, a set top box, a personal digital assistant (PDA), or the like.

As shown in FIG. 2, a mobile device 102 may include a user interface 202, one or more processors (CPU, GPU, etc.) 204, a transceiver 206, and a memory 208. Each of these components may be coupled to a bus structure, such that each component is capable of communicating with or transferring data to and/or from the other components (202, 204, 206, and 208). In various implementations, the memory 208 may be fully integrated to the mobile device 102 (one or more integrated memory storage devices), or a portion of the memory 208 may be portable, removable, remote, or the like (such as a memory storage expansion "SD card," or similar).

In an implementation, the memory 208 stores a mobile operating system (OS) 210 and one or more mobile applications ("apps") 212. Additionally, the memory 208 may also store data for the OS 210 or the apps 212 in a database 214, or other storage organization type.

In alternate implementations, a mobile device 102 may include fewer components, additional components, or alternate components to perform the functions discussed, or for other desired functionality.

Example Implementations

Referring to FIGS. 3-10, various example functions of the communication system 100 are described, according to various implementations. The descriptions relate the functionality in terms of a mobile application ("app"). This is intended to mean that the app 212 is stored in the memory 208 and includes processor-executable instructions, that when executed on the processor 204, the instructions cause the processor to perform the functionality described (in combination with other portions of the memory 208 (such as the database 214 and/or the operating system 210), as well as various hardware components of the mobile device 102 (such as the user interface 202 or the transceiver 206, for example)). In alternate implementations, other functionality or alternate forms or equivalents of the described functionality are intended and included.

In sections below, example processes are shown for the implementation of the functions described in this section. In alternate embodiments, the functions described herein may be implemented using different techniques, while achieving similar or the same results. All such embodiments are included within the scope of this disclosure.

Automatic Addition of Contacts

In an implementation, by default the app 212 treats all incoming text messages as "opt-in's" which may also be referred to as "written requests" to communicate through text messaging. The app 212 stores that incoming message and phone number in device memory 208, local databases 214 & cloud storage systems 108. This means every customer who texts into the app 212 becomes a "contact" in the mobile device.

In an implementation, The incoming phone number is stored into several data storage systems which also store other information related to the incoming text message such as the time the customer first texted into the system, what level responder type (1, 2, 3, see below), what groups they belong to, and which timed, scheduled or weekly follow-ups have been sent to them.

Opt-in System

Figure 3:
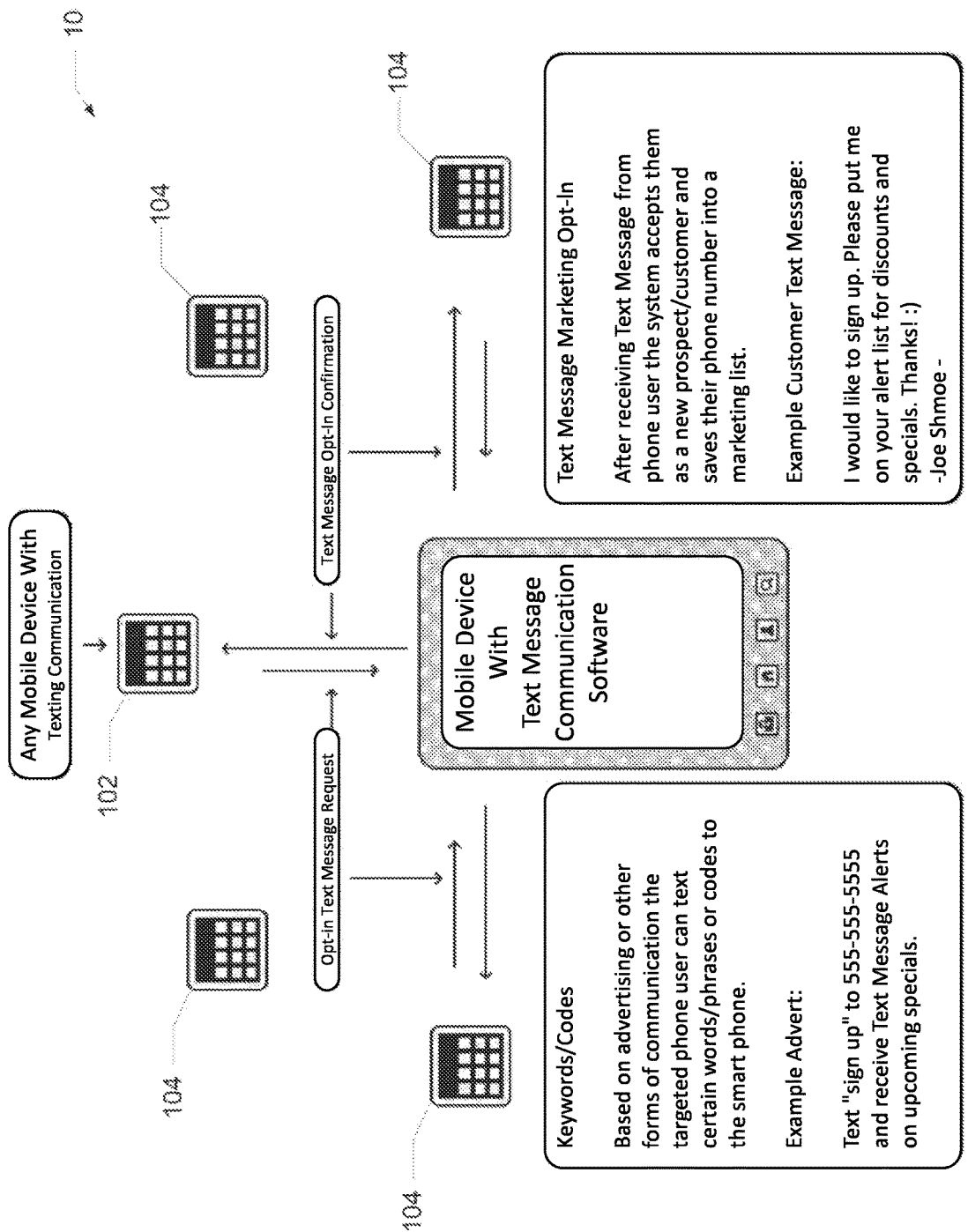
FIG. 3 is a block diagram of an example "Opt-in" process, according to various embodiments.

Referring to FIG. 3, in an implementation, the app 212 can also be configured by the user to accept the "opt-in" request only when preset rules are met or when message contains specific "keywords and/or codes" within the text message or when natural language interpretation methods indicate they "intended" to opt-in. This allows the user to direct the app 212 to ignore all incoming messages that do not fit the appropriate criteria. These same methods are utilized in the Auto-Responders system below as well.

For example, in an implementation, the mobile device 102 includes a natural language interpreter arranged to determine the content of the incoming message. In an implementation, the natural language interpreter is arranged to learn based on machine learning techniques and incoming response messages to sent communications.

In an example, the app 212 receives a text message from a customer specifically granting permission for commercial communications via text message and stores incoming number and permissions in memory. Permission can be provided through use of opt-in keywords such as signup, subscribe, deal, coupon, etc.

There are text input boxes whereby the user can define specific language in the form of words, phrases or promo codes and then require that they must be contained in the incoming message to count as an "opt-in." This assists the machine learning algorithms to define the corresponding rules for accepting an opt-in or not.

In an implementation, incoming text messages are stored in a temporary queue in memory 208. This is done so that the incoming message is not forced to be processed immediately but it can wait until later, if and when the system is busy processing other functions at the point in time the message came in. In one implementation, all message processing is performed in a separate thread.

In an implementation, the system 100 includes an administrative component stored in the memory and operable on the processor to allow a user to determine and/or adjust the one or more groups, the plurality of outgoing messages, and/or one or more user-defined rules. In another implementation, the administrative component allows the user to determine and/or adjust one or more settings associated with storing the source information, selecting the outgoing message, and/or sending a communication.

Opt-Out System (Self Removal)

Figure 4:
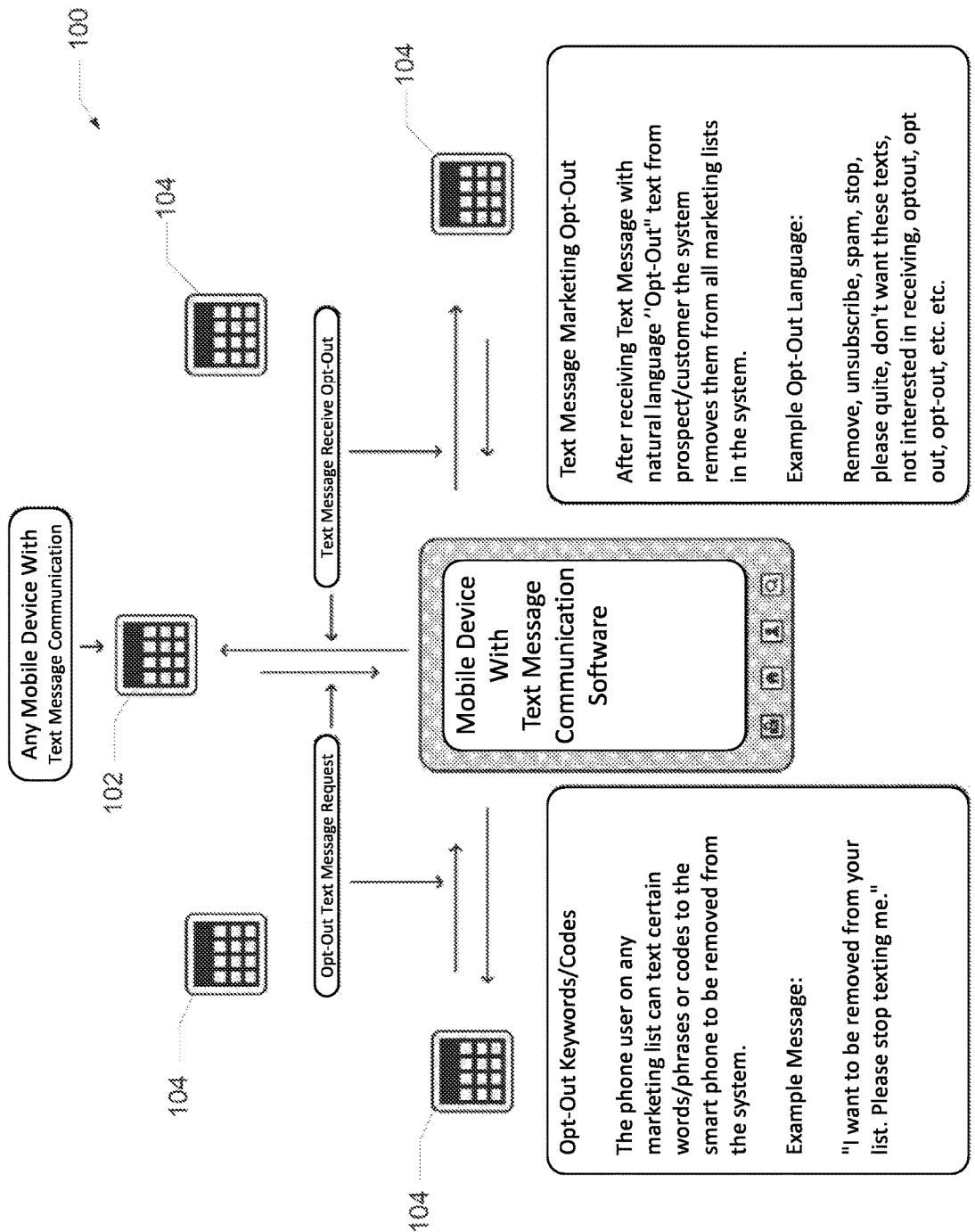
FIG. 4 is a block diagram of an example "Opt-out" process, according to various embodiments.
Figure 5:
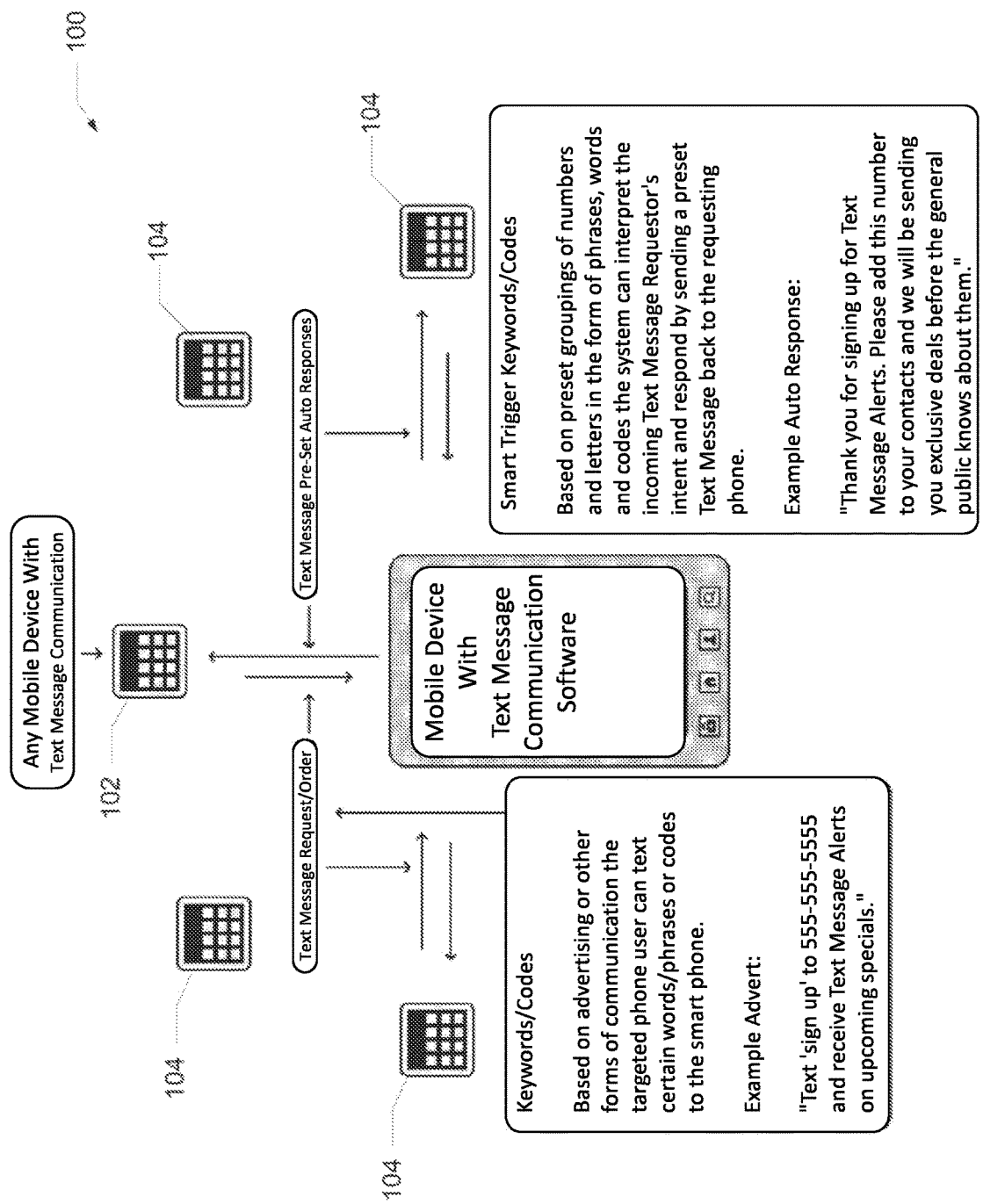
FIG. 5 is a block diagram of three example "Auto-Response" configuration systems for initial conversation with customers, according to various embodiments.

Referring to FIG. 4, in an implementation, the system 100 utilizes a method of self-removal or "opt-out" process whereby a consumer can remove their mobile number from the contacts system. The app 212 has the ability to use "natural language" keywords or phrases to "opt-out" or remove customers by making a best guess at their intent. A confidence score is created and based on the confidence score threshold, the system estimates what the customer's message intended to say. An automated confirmation message is sent back notifying the subscriber that their number has been removed from the system.

In an implementation, this "opt-out" procedure is mandatory and the system 100 does not allow users to disable it. This method may be hard coded into the application so that app 212 users cannot easily abuse customers or otherwise use the system 100 for sending SPAM. In an implementation, there is a file stored on the device containing a scrambled or encrypted list of opt-outs phone numbers. The system also can store the opt-out list in a web based system for creating a "National Suppression" or "Do Not Text" list. This prevents users from attempting to circumvent SPAM prevention.

Automatic Messaging Overview

In an implementation, the system 100 utilizes an "Auto-Response" method of sending predefined, "templated" or user customized text messages, back to the customer, based on certain criteria.

Machine Learning Algorithms

In an implementation, the system 100 uses "rule sets" for evaluating keywords or phrases contained within incoming text messages to determine which, if any, pre-configured response should be sent via text message. Priority is set first by what order the user has the auto responses listed in. If the first responder is triggered the system need not evaluate potential responses listed further down the list unless configured to do so by the user. Users also may determine additional keywords, in a comma separated list, that each responder uses to evaluate the intent or question contained within the incoming text message.

Sequential Automatic Responder Conversation Messages

In an implementation, the app 212 initially utilizes multiple levels of sequentially ordered automated responses that create the "appearance" of initial conversation between customers and the user. Each sequential responder level can be enabled to have its own multi-keyword based intelligent auto response. (See FIG. 5.) This allows the user of the system 100 to predefine basic back and forth communication with customers and count messages, visits, purchases, coupon redemptions, etc.

In an implementation, the app 212 counts how many times a customer has texted into the system 100. The counting method may be configured to exclude customers who do not trigger a sequential responder or auto-responder based on their criteria. Hypothetically, a customer may have texted in a specific amount of times but the app 212 gave them credit for a different number of times.

Typically the 1st responder is reserved for and dedicated to sending the initial response when a customer opts-in to the system 100. In an implementation, the system 100 receives a text message and, if enabled by the user, sends a pre-configured automatic text message response to the customer. This auto response can be triggered by several triggers, such as whether the incoming text message is the 1st, 2nd, or 3rd, etc. time the customer has texted into the system 100, or it can intelligently respond based on what keywords were present in the body of the incoming text message. (See Level 1, 2, 3 Responders section below)

Automatic Response Levels

Level I Responder:

In an implementation, responder messages can be sent after first initially receiving an incoming text message from any customer's phone number that is not already in the system 100. There is a field for allowing the user to add keywords that will be used to consider the incoming message as an opt-in. This method labels the customer as "New Contact" and adds it to the first tier or prospect/customer list.

One specific non-limiting example use is where a business puts up a sign that that says: "Text 'SIGNUP' to 509-954-3437 to receive notifications of specials and clearance deals." Once the app 212 receives the message it applies the intelligent keyword auto reply rules to determine whether a message should be sent back. If the method calculates that a message is to be sent, the system then sends the customer, who signed up, whatever specific auto response the user of the system pre-configured.

Level II Responder:

This level can be enabled to send directly after receiving a second communication from a customer who is already in the system. This method labels the customer as "Responded Once," or something similar, and adds them to that second tier or prospect/customer list.

One specific non-limiting example use is when a contact responds positively or negatively to a specific message sent either as an initial responder, auto response, a weekly message, scheduled message, or from a single mass communication.

Level III Responder:

This intelligent auto response system allows automatic sending of an auto-generated response after receiving the third sequential message from the contact. This method labels the customer as "Responded Twice," or something similar and adds them to that third tier prospect/customer list.

One specific non-limiting example use is when a contact responds positively or negatively as in the example of the second level but does not "opt-out" or "remove" themselves from the marketing lists on the app 212 user's app 212.

Multi-Count Responder:

The method of classifying and categorizing customers based on the number of times they texted in or the number of times their texts qualified can be used in many ways. One specific non-limiting example use would be to allow a user to create a rewards program or other system for rewarding customers based on their interactions and or the quality of their interactions. A user could provide a coupon or other special based on the number of inbound texts, coupon redemptions or purchases by the customer.

Retail stores and other users may even have the customer hand them their mobile device 104 to show the text message. The user then sends a text on behalf of the customer back into the system 100 with a keyword matching the criteria for a specific custom responder they previously set up for "redemptions." This would allow the user to control how many times a customer could use the coupon or other special indicated in the message they received from the user.

Multiple Contact Groups

In an implementation, each time an additional auto-response is created by a user, the system 100 auto generates a contact group list. Each customer that sends a message containing criteria that matches a specific responder gets added to the contacts group associated with that responder.

The user can configure the function to add all customers that match the criteria to that group or only ones that match at the same time the responder actually sending a message. This can be referred to as auto list segmentation based on audience engagement. One specific non-limiting example use is when a user is a business and they have an auto-response setup for "Location" where customers can ask "where" that business is located. Each contact that triggers that responder or matches the criteria can later be sent a text message informing them of the businesses' new location.

Message Scheduling

Reoccurring Daily/Weekly Message Scheduling

Figure 6:
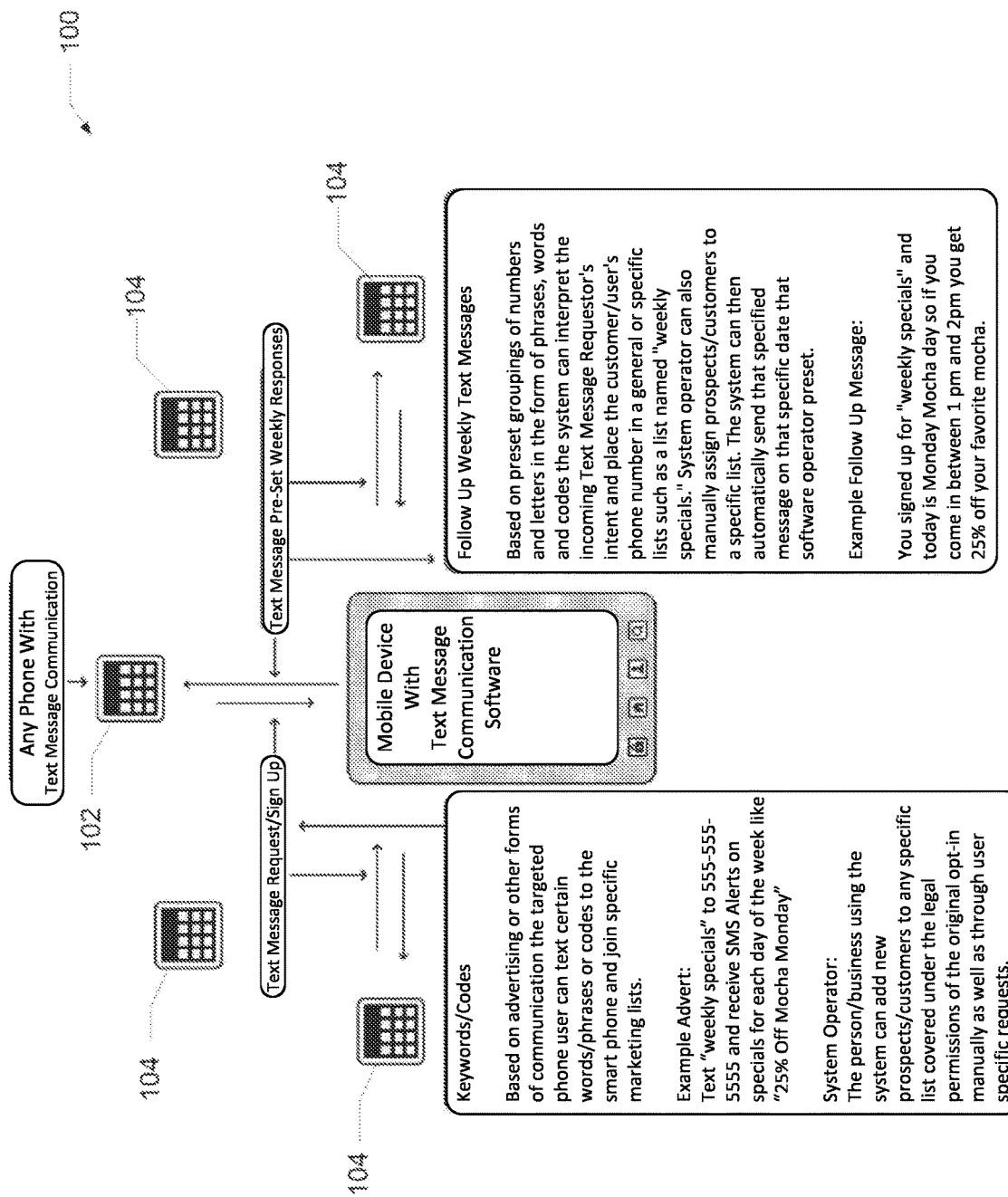
FIG. 6 is a block diagram of an example "Weekly" or "Daily" scheduled follow-up message process, according to various embodiments.

Referring to FIG. 6, in an implementation, the system 100 has "Weekly" scheduled communications available for configuration on a list-by-list basis. Users can select any group stored in the system to receive a text message on each specific day of the week. Each day of the week can send to a different system contact group. By default, the system sleeps during nonworking hours (8 pm to 7 am, unless configured to sleep during different times by the user) so people are not bothered at night by getting these messages.

FIG. 6 visually describes the "Daily" or "Weekly" pre-configured automated messages. The customer can opt-in to specific marketing lists, one of which can be this type of "day of the week" automated text message. The system queues up the list to be sent and sends them one at a time with a specific time delay between each message sent.

One specific non-limiting hypothetical use may include having a coffee shop pre-configuring a "Monday Mocha Day" special where a message is delivered to each contact in the group chosen. Example: "It's Monday Mocha Day! Show this text message and get your first Mocha at 50% off."

Timed Sequential Follow Ups

Figure 7:
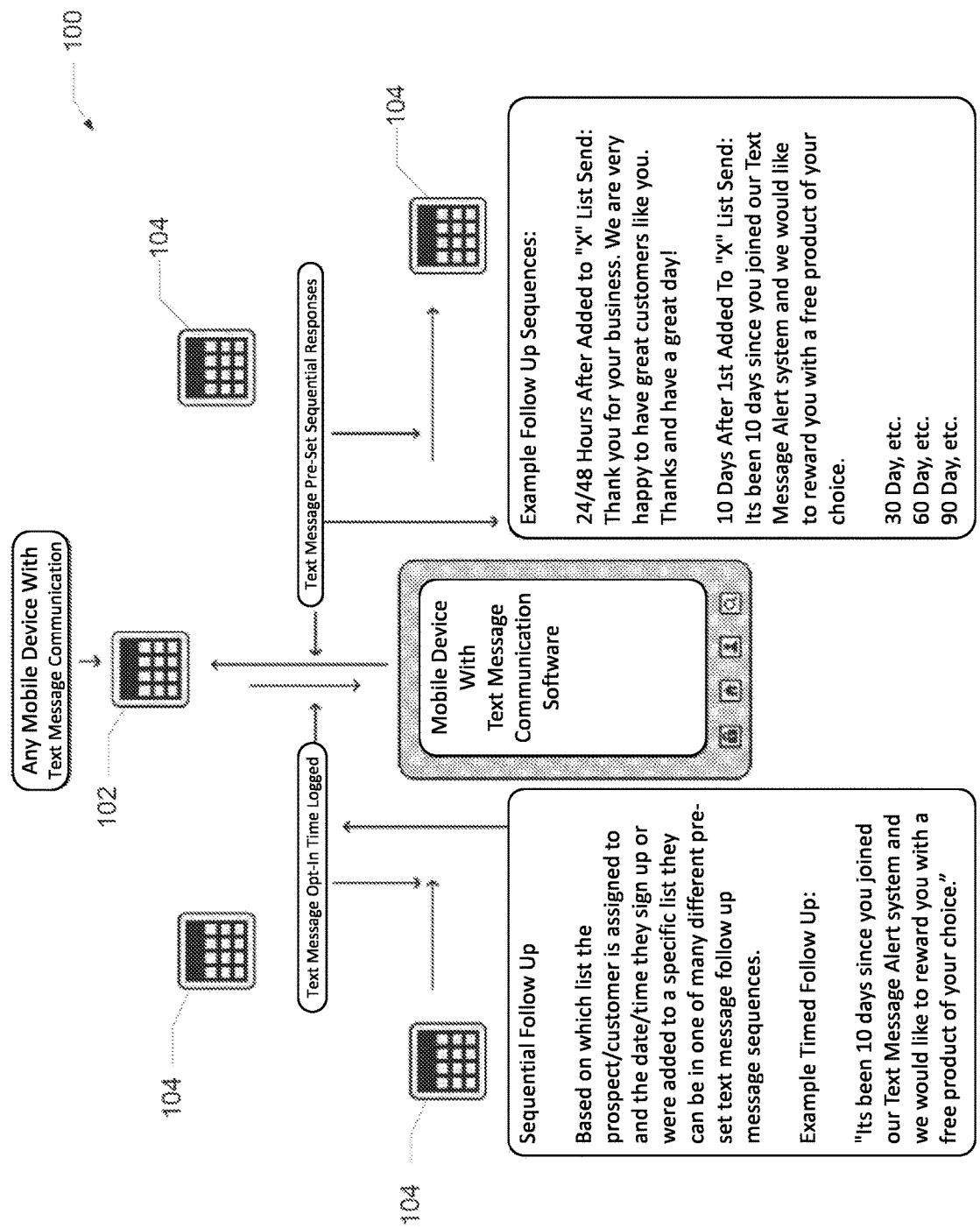
FIG. 7 is a block diagram of an example sequential "follow up" text message process, based on a count of time durations, according to various embodiments.
Figure 8:
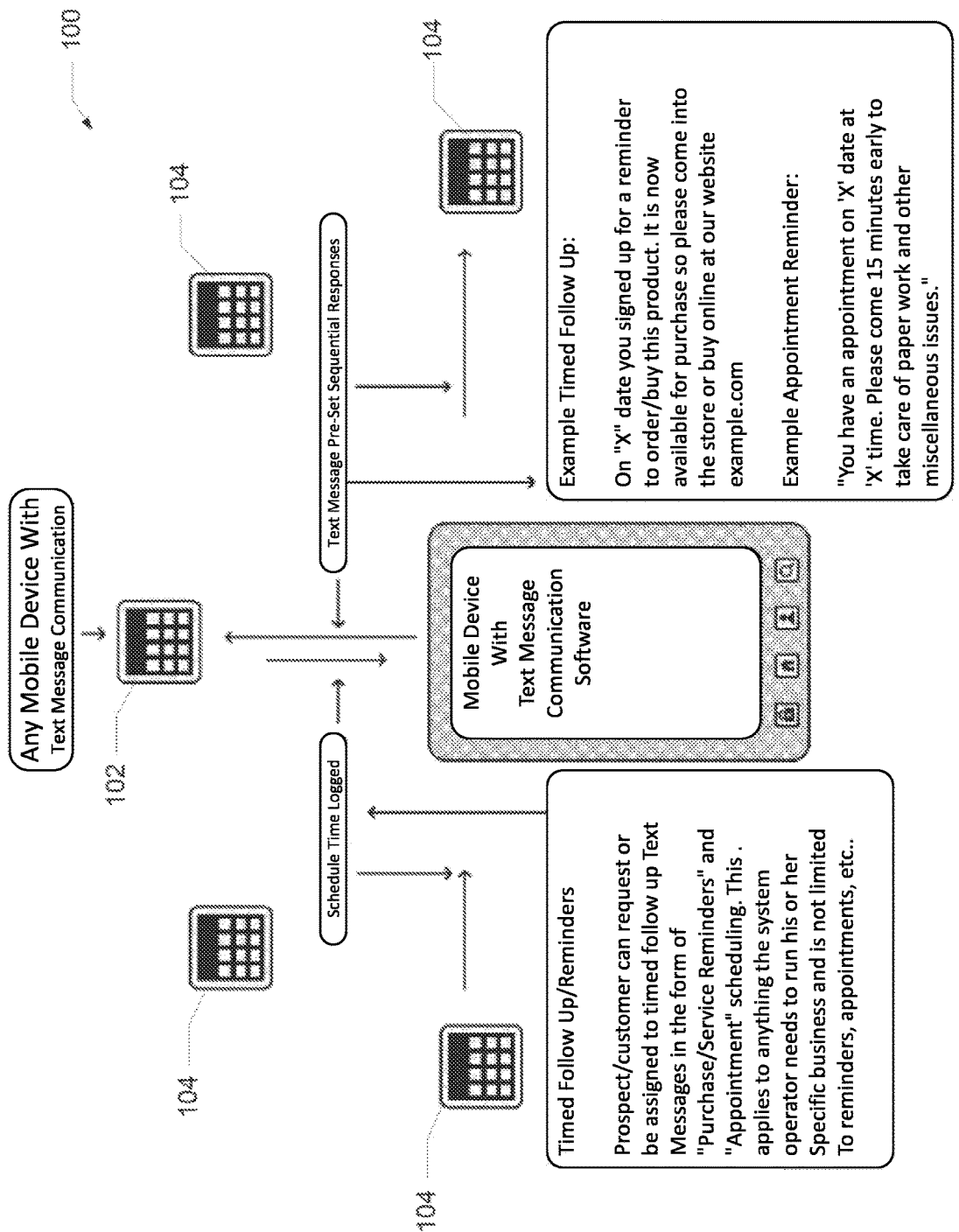
FIG. 8 is a block diagram of an example timed duration "follow up" or appointment text message process, according to various embodiments.

Referring to FIG. 7, in an implementation, the system 100 has "follow up" automated text messages stored that are configured to be sent to customers in a sequential time based method. The sequence timer starts from the point when the new customer was entered into the system as a contact or after they were added to a specific group. One specific non-limiting hypothetical use may consist of the first message being scheduled for sending 24 hours after first receipt of a message from a new contact, second in 3 days, third in 10 days, fourth in 60 days, fifth in 90 days, etc.

One-Time Scheduled Follow-Ups

In an implementation, the system 100 allows a user to specify a specific time in the future for a single or group text message to be sent out. One specific non-limiting potential use would be a medical professional who want to schedule appointment reminders for a patient or group of patients. (See FIG. 8.)

The user can also schedule future messages to be delivered to individual contacts or groups of people on a one time basis. (See FIG. 9.)

Mass Text Messaging

Figure 9:
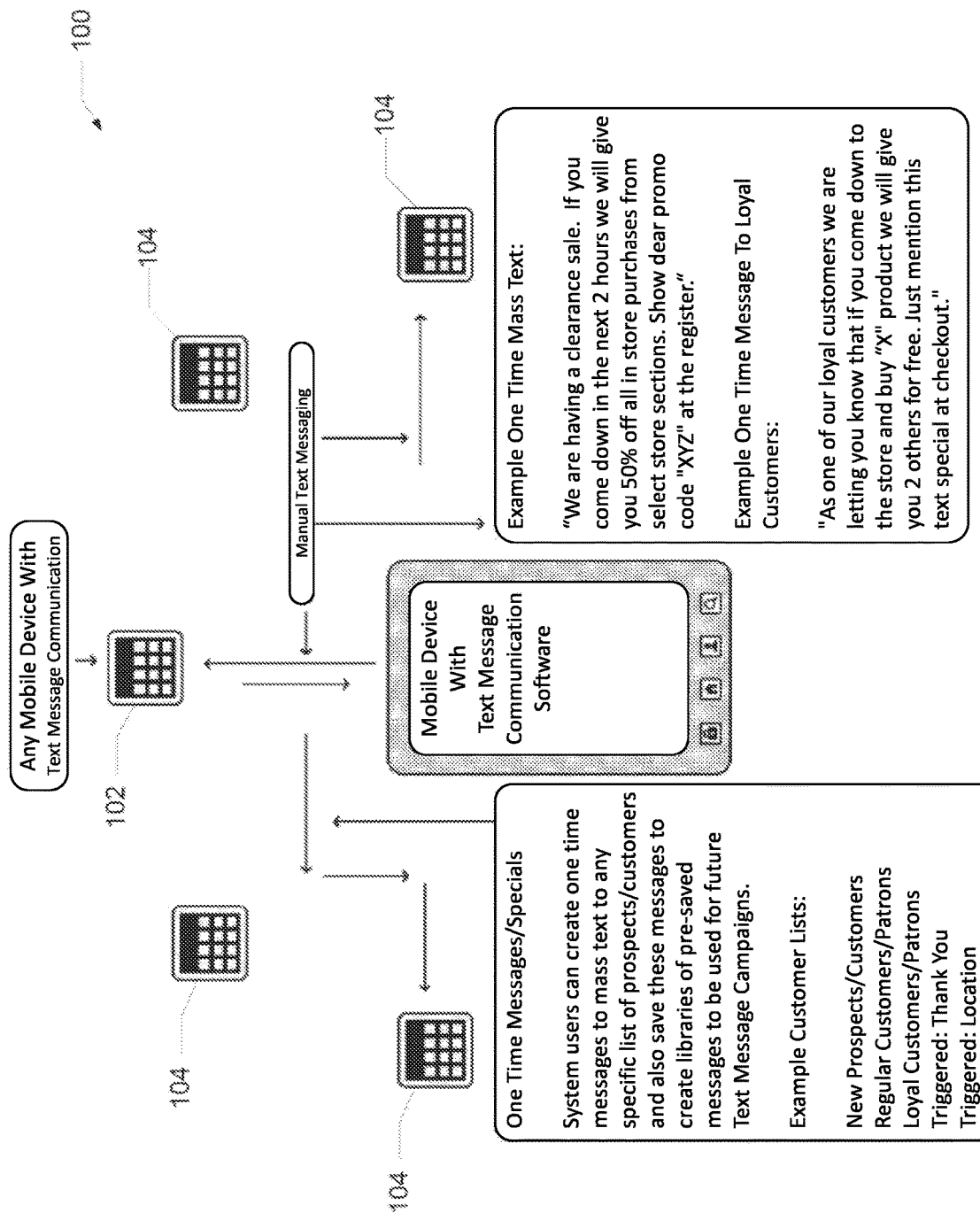
FIG. 9 is a block diagram of an example "One Time" technique that allows a user to send out a one-time mass marketing message, according to various embodiments.

Referring to FIG. 9, in an implementation, the system 100 allows for a text message to be sent as a mass communication to a plurality of mobile devices 104. The app 212 allows users to send to "all" the contacts or to people in one or more specific groups. The user can also narrow the specific group by area code or other search criteria before sending. The user can specify a picture, image or video to be attached/embedded into the message.

One specific non-limiting hypothetical use includes sending a mass text alert to all customers in the "New Contacts" list that says: "We have a new special. Please come by and ask about it and get a discount!"

Text Message Forwarding

Figure 10:
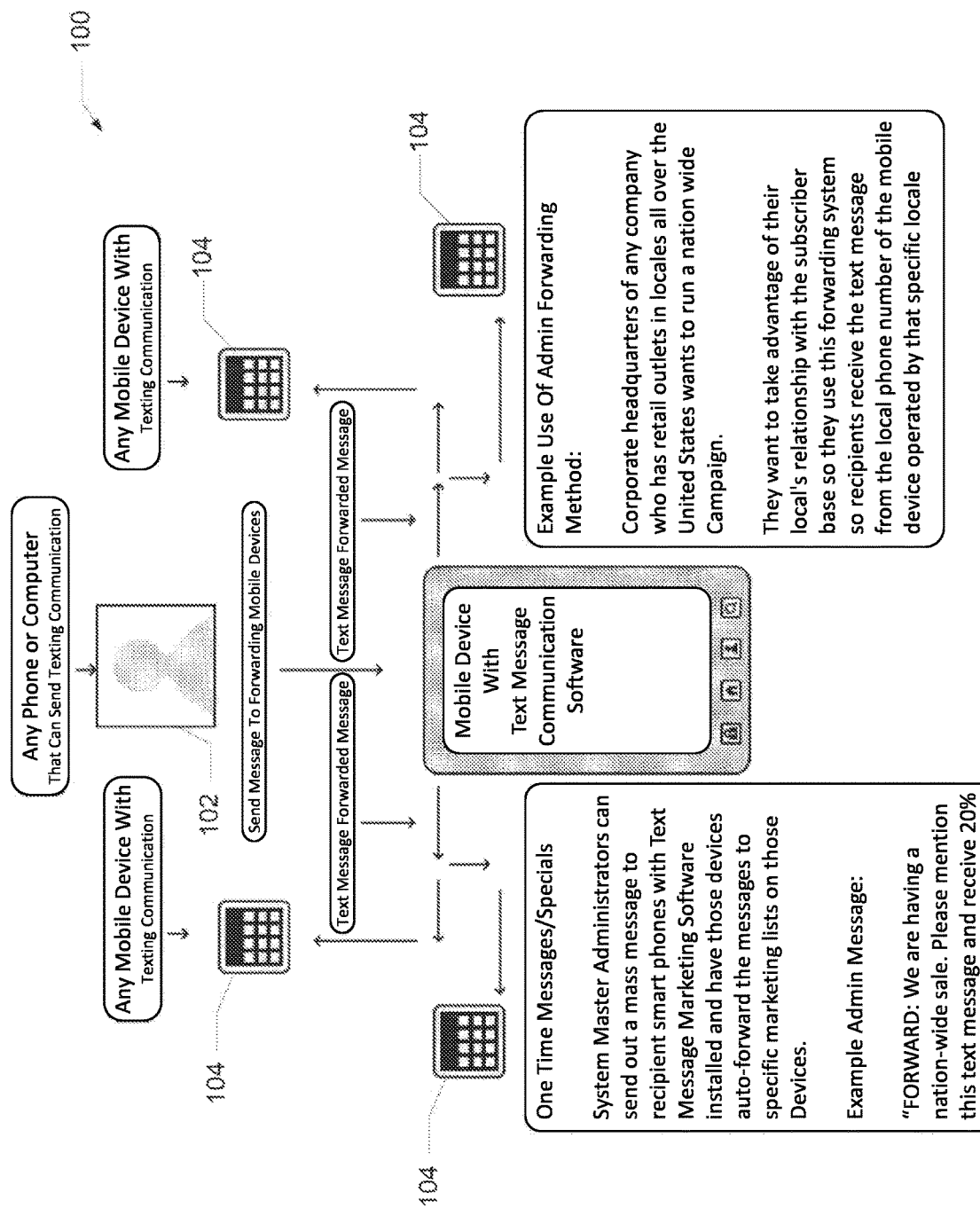
FIG. 10 is a block diagram of an example "Text Message Forwarding" technique that allows for a central command to send a message to all phones in their system, which automatically forwards the message to their local marketing lists, according to various embodiments.

Referring to FIG. 10, in an implementation, the system 100 allows for a central command and control center, such as a franchise headquarters or other main structure of a business (i.e., an "executive entity"), to send a text message to each of the mobile devices 104 operated by their many franchisees/locations and then have that message automatically forwarded to each of the contacts in any one of the local store/location's group lists.

The master controller 110 can specify keywords in order to select a specific group to send to. This would allow the master controller 110 to send to all, one or many groups within their affiliate's devices. This same control can be granted via a web based interface or mobile app 212 interface where a "signal" is pushed to the slave devices.

Sleep Timer

In an implementation, to prevent users from sending text during the night the system 100 may be configured by the user to automatically pause all campaign sending until the wake timer triggers the next morning. This helps users keep their customers happy and at the same time helps them minimize legal issues that may exist with sending text messages at night.

Account Level

In an implementation, users may have a limited number of texts they can send for free. Thereafter they are required to subscribe to a monthly plan that provides them with more texts. Inbound messages are not counted.

Maintenance

New Opt-Ins/Opt-Outs

In an implementation, when the system shuts off due to a technical error, glitch, battery failure or the like the system 100 rescans the incoming messaging thread and checks to see if there are any new opt-ins or opt-outs that need to be processed.

Responder Checks

When the app 212 starts up it also checks the incoming thread to categorize users into the responder groups and processes any responses that are triggered.

Harvest Mode

There are several ways a customer can enter the system 100, i.e., opt-in, triggering a responder, manual entry by a user, contact import by the user, csv, cvf, txt import by the user, url import by the user, and Harvest mode. When Harvest mode is activated it scans the body of incoming messages and parses out anything that seems like a phone number and treats it as an opt-in and processes it for appropriate auto responders and group segmentation.

Delete Thread Messages

Mass text messaging can clog up a device's messaging thread. Delete By Age

Users can configure the app 212 to automatically delete messages older than a specific date.

Delete By Count

User can configure the app 212 to delete all old texts by means of specifying an amount of messages to tolerate. The user might set it to 100 messages and delete all messages except the most recent 100 messages, for example.

Backup & Restore Data

In an implementation, the system 100 allows backup and storage of the all user data and configurations to local device storage such as a SD Card and also an online storage system 108 which may utilize an "email" and "password" as the security for accessing the storage, for example. The system 100 allows for the list of numbers to be restored to the smartphone, tablet or other mobile device in case of damage or replacement of the specific device 102.

Natural Language Interpretation

In an implementation, rule sets compare the text in an incoming message with information already known to the system 100 in several ways, with the goal of either matching them directly or understanding the "intent" of the message and matching that to the appropriate function.

Keywords (Small Data Lists)

In an implementation, there are a list of keywords that, if found in exact match form in the inbound message, would trigger that specific responder. This is the foundation of the interpretation system. Instead of strict character by character exact match being the only way of matching, the app 212 does the comparison of the message and if it contains the target keywords and are also within a configurable number of characters of the same length, it declares a match. An example would be: "Thanks!" in the incoming message would match "thanks" or "thank" but probably not "no thanks" and thereby be a more realistic match. Local Hashmap/Data Dictionary (Medium Data Lists)

In an implementation, the app 212 contains manually compiled lists of thousands of keywords for auto grouping customers and targeting specific responders.

The app 212 uses key value pairs to store the data.

Example of a label with paired value: "thanks", "thank you for the super deal!"

In this instance, if the app 212 receives an inbound message containing the exact phrase "thank you for the super deal" and has a length within specified length of characters of the paired value it is considered a best match. The system triggers the responder assigned the category label "thanks" and fires off that responder if the user of the app 212 has it activated.

Web Hashmap/Data Dictionary (Large Data Lists)

In an implementation, the full super lists of keywords, phrases and sentences are stored on external web servers. If the app 212 fails to find a match in the local Small Data List of keywords or the local Medium Data Lists it will ask the server if there is a match against the full data list. If there is a match, the system will respond with the category label assigned to the matching responder. The app 212 then fires off the corresponding responder with the matching category label and additionally segments the customer into the appropriate grouping classification.

Google Prediction API & Other Artificial Intelligence API's

In an implementation, if the app 212 does not find a best match in the local and web data lists it will then send the body of the inbound message to a trained machine learning API such as Google Prediction API which was trained by using the entire super Large Data Lists that were previously loaded into the machine learning cloud system. Those machine learning systems have various forms of proprietary and open source artificial intelligence algorithms.

Ongoing Training of System

In an implementation, the app 212 will watch how users manually respond to inbound text messages and use that data to further enhance the local data list as well as be used as crowd sourcing for making the entire system smarter over time.

How Lists are Generated

The first step is for as many people as possible to write variations of what someone might text into a business. A writer is given a scenario then asked to write 20-50 variations of how the potential inbound message might be written.

Keyword Phrase Generation Step 1

Example For Creating Data Lists For "Unhappy" Customer Responder: "Imagine you are a customer of a restaurant and you had a bad experience with the food and service. Write 20 or more ways a potential customer might report this experience. Be sure to include text message acronyms, slang and even common typos and grammar errors."

Keyword Phrase Generation Step 2

After collecting examples of texts for this subset of the data for the "Unhappy" Responder, they are then exchanged between writers and they all manually add as many new variations as possible.

Keyword Phrase Generation Step 3

Once the manual writing process is completed the variations are then run through software such as thebestspinner.com and various others which are designed to use dictionaries, thesauruses and crowd sourcing to automatically create thousands of variations of the text. They commonly exchange all synonyms for each word or phrases in the data.

Keyword Phrase Generation Step 4

At this point, typically there are many thousands of variations of the keyword phrases in the data list. They are then manually gone through and the lower quality keywords, phrases, sentences, etc. are removed. The lists are peer reviewed by other writers.

Keyword Phrase Generation Step 5

The data set is then added to a web-based machine learning system for testing. Most machine learning API's such as Google Prediction API provide confidence levels for the likelihood that a given example text matches with a given category label. A confidence rating is set to a specific threshold where if the confidence rating is below the set number, the response is ignored.

Keyword Phrase Generation Step 6

The keyword lists are uploaded to a live testing web or mobile app. The scenario is again placed before participants and they are asked to write an example of how the potential customer might write that inbound message. The system gives them a category label with a description and the participant is asked to rate the response as correct or incorrect.

Keyword Phrase Generation Step 7

If they respond with "correct" then the system sends that data to the machine learning system to reinforce the training. If the response is "incorrect" the system asks the user to select from a group of category labels that best match the example message. Upon selection of the closest category label the information is then sent to the machine learning system for further training. Additionally, the system updates the small data sets stored in the local storage system of the device, as well as the medium web data set.

Representative Process

Figure 11:
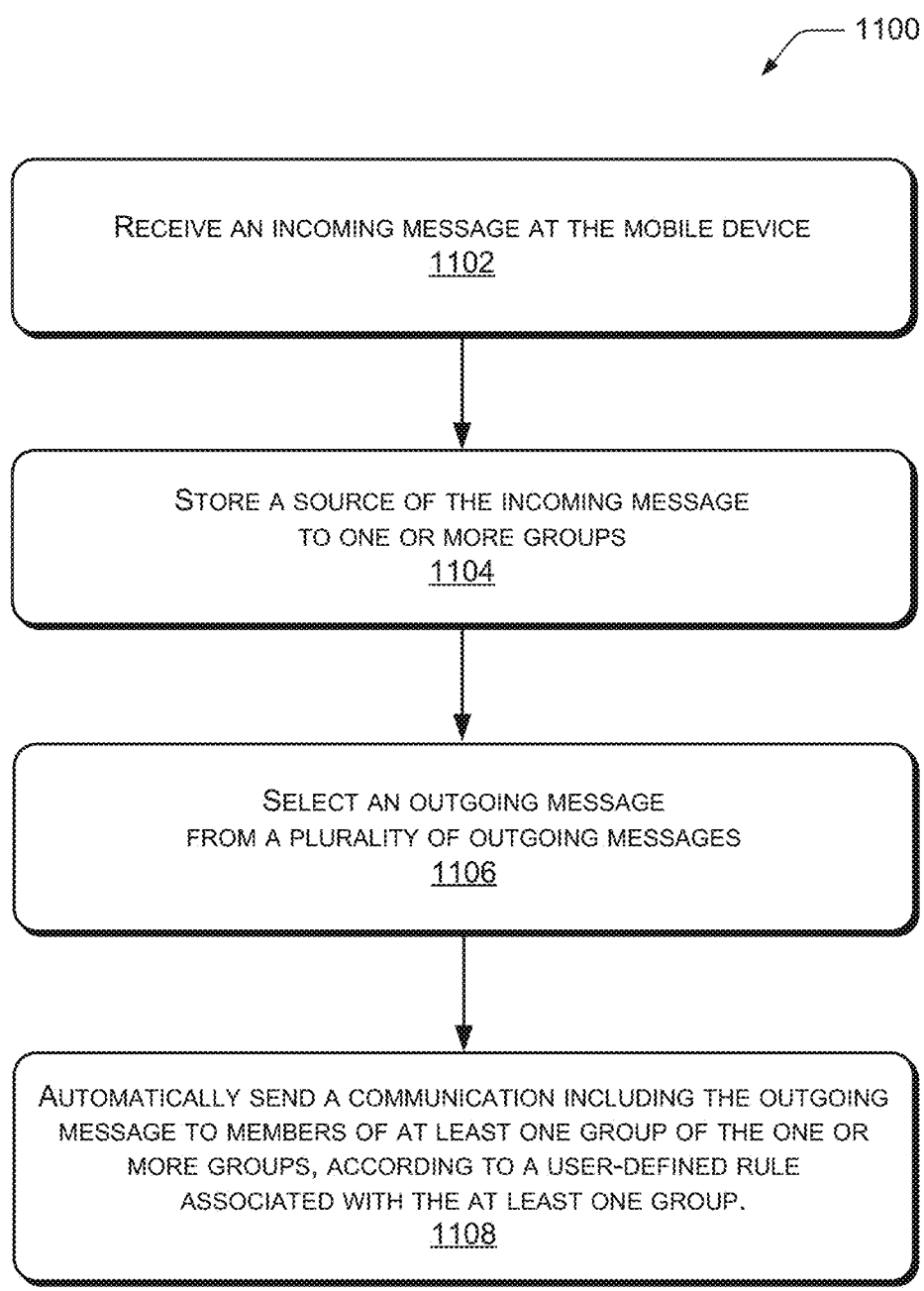
FIG. 11 illustrates a flow diagram of a method of communicating with a plurality of mobile devices from a single mobile device, according to an implementation.

FIG. 11 is a flow diagram illustrating an example process 1100 for operating a mobile device (such as mobile device 102, for example) to communicate with a plurality of other mobile devices (such as mobile devices 104, for example), based on instructions stored in a memory of the mobile device (such as via a mobile application ("app")), according to an implementation. The process 1100 is described with reference to FIGS. 1-10 and 12-32.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 1102, the process includes receiving an incoming message at the mobile device. At block 1104, the process includes storing a source of the incoming message to one or more groups, based on a content of the incoming message, the one or more groups stored in the memory of the mobile device. In an example, the process includes storing contact information and group categorization information associated with the source of the incoming message in the memory of the mobile device. In alternate implementations, the process includes storing other information associated with the source of the incoming message (e.g., preferences, payment information, etc.).

In an implementation, the process includes using a natural language interpreter to determine the content of the incoming message. For example, the natural language interpreter may be arranged to learn based on machine learning techniques and incoming response messages to sent communications, or the like.

At block 1106, the process includes selecting an outgoing message from a plurality of outgoing messages stored in the memory of the mobile device for each of the one or more groups. For example, an outgoing message may be selected for each group, based on the nature of the group (e.g., repeat customers, potential customers, elite customers, customers from a particular region, etc.).

At block 1108, the process includes automatically sending a communication including the outgoing message to members of at least one group of the one or more groups, according to a user-defined rule associated with the at least one group, as described above.

In an implementation, the communication comprises at least one of a text message, a multimedia messaging service (MMS) message, an enhanced messaging service (EMS) message, or a short message service (SMS) message. Alternately, the communication may comprise a combination of two or more of the message types described, or other message types.

In an implementation, the process includes automatically sending a communication including a reply to the incoming message, to the source of the incoming message, based on the content of the incoming message. For example, the content of the message may indicate an opt-in to a single message (a coupon offer, for instance), a message subscription (weekly deals or recurring specials, for instance), or the like.

In another implementation, the process includes automatically ceasing to sent communications to the source of the incoming message based on the content of the incoming message. For example, the content of the message may indicate a desire to not receive a particular offer message, a message subscription, or to not receive any further messages at all.

In an implementation, the process includes sub-categorizing the source of the incoming message into one or more sub-groups, and sending a communication to members of the one or more sub-groups, based on user-defined rules associated with the one or more sub-groups. In alternate implementations, the groups and sub-groups may be sub-divided to any desired granularity, for the convenience of the user in targeting a desired set of mobile devices.

In an implementation, the process includes adjusting the storing, the selecting, the sending, and/or the user-defined rule(s) at the mobile device via a mobile application stored in the memory of the mobile device. In the implementation, the processor-executable instructions are provided at least in part by the mobile application stored in the memory of the mobile device. For example, any or all of the functionality described herein may be accomplished via a mobile application ("app"), or the like, stored in the memory of the mobile device and operable on the processor of the mobile device. This may also include the ability for a user to make adjustments to settings, rules, or the like, via the user interface of the app or through settings in the mobile operating system regarding portions (e.g., the transceiver, input/output components, etc.) of the mobile device accessed by the app.

In an implementation, the process includes forwarding the incoming message to members of at least one group of the one or more groups based on the content of the incoming message and/or the source of the incoming message. For example, if the incoming message is from an executive entity (a franchise headquarters, for instance) and the message content indicates that the message is to be forwarded to a desired audience, then the mobile device automatically forwards the message once it is received. In various implementations, the content (including the subject line, and the like) may indicate that the message is to be forwarded by the use of predetermined codes (e.g., keywords, phrases, characters, etc.), or the like, used by the sender.

In an implementation, the content of the incoming message may indicate a targeted group or sub-group to forward the message to. For example, the content (including the subject line, and the like) may include references to a geographic region, a demographic, a gender, or the like.

In an implementation, the process includes automatically sending another communication to the members of the at least one group of the one or more groups based on at least one of: a user-selected time duration since sending the communication, a day of the week, a day of the month, an appointment date, and a special event, as described above. Additionally, in another implementation, the process includes automatically sending another communication to the source of the incoming message, at a predetermined date and/or time, based on a keyword included in the incoming message.

In alternate implementations, other techniques may be included in the process 1100 in various combinations, and remain within the scope of the disclosure.

Background Processing Systems

Example processing systems are described, according to various implementations. The processing systems described herein relate to the functions and techniques described above. They represent examples of how the functions and techniques may be carried out in a communication system 100, a mobile device 102, or the like.

Particularly, the processing systems described in this section show example performance components, modules, routines, and the like, as the processor 204 executes the instructions of the app 212 during various modes of operation to provide the desired functions. In alternate implementations, additional, other, or equivalent processes may be used to accomplish the described functions.

ASmallBizTextService

This "service" is the heart of the app and is what makes all the before mentioned functions and systems work when a user does not have the app 212 directly opened and is not clicking on a button or configuration option to make it work.

In an implementation, all "handlers" are spawned, and managed from this service. Most screens bind to this service to access the functions across the app. The main customer database is controlled here, along with the groups database.

Also, this is where the text receiver is registered. Once a text comes in, it gets directed to the incoming handler after stripping the number of special characters, and ensuring it starts with 1 (this can be removed in an international version).

There is also an alarm receiver, which is used to restart a one-time blast (if it ran into the sleep timer before finishing), and scheduled follow-ups. The service then tells whichever handler to start. A lot of data is controlled here as well.

General Data Storage

There are a few ways that data gets stored in the app:

I. SQLite Databases

This is same across most handlers, and the main text service.

II. Android Preferences

III. Binary File Storage

II and III are wrapped into one single class, DataStore. When storing a boolean, String, int, or Long, it uses android preferences to store the data. Otherwise more complex objects such as ArrayLists, and HashMaps get stored to a binary file. The DataStore class has methods for backing up, and restoring. For preferences, all tags are backed up and restored. Binary files are backed up and restored as well, but require new code when adding/removing data.

Incoming Message Handler Process

Initial Text Message Receipt

When a text message is received, the system first strips all special characters (+, −, (, ), etc.). It is then added to a Queue, along with the message that came in, the time the message was received, and a randomly generated String to use as an id. This queue holds a private class (IncomingSMS) which stores information for each incoming message.

The IncomingSMS class is used to track a message through all of the checks done throughout the process. The properties saved are the phone number, the message, time the message was received, if the phone number is a removed contact, if this message has sent a query to the prediction API, the API response, if the message was harvested from another inbound text message or not, the time a query was made to the API, if the message was scanned in from the SMS thread or not, and if the message has retried sending to the API server. In other embodiments, other information is also or alternately saved.

Initial Message Processing

Once the incoming handler sees it has an available message to be processed, it starts its checks against the incoming handler. The first to be done is to check whether the incoming number is a removed customer or not (by checking to see if the number exists in the removed contacts database). Right after this checking process is completed, registration checker starts it's thread. It checks if the incoming number is from any of the registration numbers, and if so, then scans the message. This is used so that commands can be sent to the app (like sending bonus texts, deactivating/reactivating an app, text forwarding, etc.).

Opt-Out Checks

The next check is to see if the message is an opt-out. The first opt-out check looks to see if the message in the inbound text matches one of the predefined opt-out keywords like stop, unsubscribe, etc. If it matches, the system 100 removes them from all marketing lists immediately and sends a confirmation message to the customer and also adds them to the removed database.

The second check is to determine if the customer has previously messaged something that seems to "intend" they want to opt-out from the system. In that case the app 212 checks the opt-out queue (The opt-out queue holds a list of customers who potentially have requested an opt-out). If the number is already in this list, and the confirmation response keyword "remove me" is in the message, then the customer is removed from all databases in the app 212 (except for the removed database, which it gets added to). The incoming message is then down-cased, and all periods, commas, and single quotes are removed from the message.

The third opt-out check is to see if the message is a landline opt-out. If this check is triggered, then the number contained in the message is removed from all databases, and added to the removed database, and no text is sent to intended number, as it's a landline.

In an implementation, a separate background service thread scans the incoming queue to check for opt-out text messages. If it finds any, it immediately removes them from the database (along with adding them to the removed database). Removed customers are saved in a separate database. The system periodically scans the "live" database to insure that a removed customer hasn't been added back in. This database is not accessible to the app user. Also, periodically, the database may sync up to an online removed database. This is all done in a separate thread, so it doesn't slow down the UI.

Manual Opt-Outs:

There is also a text input box enabling the user to manually opt a customer out of the system. Additionally, when viewing a message from a customer there is a menu option for opting the customer out.

Opt-Out Scanner

The opt-out scanner is a separate thread which scans the Incoming queue from the Incoming handler for opt-outs. In the case that the system gets backup with a lot of incoming messages, this scanner is useful for getting rid of opt-outs as soon as possible.

This class also contains methods for scanning the device's default SMS thread for opt-outs that is used by the Update Handler, and when running the maintenance option.

Removed Contact Handler

This handler (also its own thread) checks to make sure opt-outs stay opt-ed out. The first thing it does is check if a backup removed database exists. If the current count of the removed database is 0, and there is a backup, it will restore the database, which is backed up to the SD card at the "Android/data/com.data.sec/userdata.db" location of the device's external storage (this is usually an SD card, but some phones have internal storage which acts like an SD card). Then it checks to see if there are phone numbers waiting to get removed from all databases, and if so, processes the removal of the numbers one at a time.

Each contact in the removed database is checked every 6 days. The check consists of seeing if the number exists in the main database, and if it does, it gets removed (no texts are sent). One number is handled at a time. When there are numbers to be checked, the interval is set to a smaller time (so it processes faster), then increased when there are no more to check. The database is also backed up to the location stated above every 12 hours the app is running Preloaded Response Checks The next check is to scan against a preloaded file of possible phrases. This check could also be wrapped into the opt-out checks, as it has many phrases to detect opt-outs, but it's not just opt-outs it checks for, so it belongs in its own section. This check was added to avoid sending every message to the prediction API (which was causing issues trying to send out queries when the system was busy). The scan takes each phrase, and checks to see if the incoming message contains it.

Each phrase is tied to certain responder groups in the system (opt-ins, new contacts, the standard responders, opt-outs, etc.). If this check is triggered, meaning a match has been made between the incoming message and a local keyword list, then the resulting category label response is saved in the IncomingSMS as the API response. If no phrases from the local lists are matched with the inbound message, then "Check API" is saved as the API response.

If a local match fails and the message is sent to the external web API and the API response category label is "unsubscribe", then the incoming number is added to the opt-out queue, and a removal confirmation request is sent to the number. If the number is already a removed customer, the message is ignored, and removed from the incoming queue. If the API response is anything but "opt-in" and the number is a removed contact, then the message gets ignored and removed from the incoming queue. If none of these apply, the message then moves on to check against all remaining responders.

Harvest Mode Check

If harvest mode has been activated, the system then scans the incoming message for any phone numbers found therein. If it finds any, it then removes the current incoming message from the queue, and adds a new one to it, with the parsed phone number pulled from the message body. The new message body to be analyzed is the same, minus the phone number that was in it. If no number is found in the body of the message, the message continues on normally to be analyze against rules for additional responders and group segmentation.

Main Responder Checks

I. New Contacts

There are two ways numbers get added to the new contacts list, assuming the number does not already exist in the database. The first is when no keywords are specified for the new contacts response, and no keywords are specified under block keywords (or no blocked keywords are found). The second is when the correct keyword was matched to the message content, and no blocked keywords were found.

If either of these conditions are met, then the number gets added to the database, along with the time it was added to the DB, the group they belong to (all contacts first get added to the main—new contacts—group). The number also gets added to the Timed Follow ups database, along with the time it came in, so that follow up texts can be sent based upon when the customer first texted in. The message is then passed onto the other response check processes.

II. Responded Once

If the number is found in the database, it then checks to see which category the number is in (New Contacts, Responded Once, or Responded Twice). If the number is a New contact, then the Responded Once responder will trigger (if active it will send the text, but the contact will be switched to the Responded Once category no matter what). The message is then passed onto the other response checks process.

III. Responded Twice

If the number is found in the database, and it is in the Responded Once category, then the number will get switched to the Responded Twice category (and the response will be sent as long as it's active, and all conditions are met). The message is then passed onto the other response checks processes.

Other Response Checks

After checking the Responders that are based on the number of times the customer has texted in (Main Responders), the system 100 then checks a set of other customizable responders (Standard & Custom Responders). First it checks to see if any of the manually added keywords in the "Standard" responders match with the incoming message. If none are matched, it will then check the second level of local Small Data Lists to find a match. During the course of these checks, if there is a match the appropriate response is sent (if that responder is active, and no blocked keywords were found), and then message is removed from the incoming queue.

If any "Custom" responders are activated, the message is scanned for any keywords. If any are responders are triggered, the appropriate response is sent (assuming no blocked keywords were found), and the message is removed from the incoming queue.

If no match is found on the device for manually added keywords or the Small Data List the system checks an external web API containing a larger data list. If any are responders are triggered, the appropriate response is sent (assuming no blocked keywords were found), and the message is removed from the incoming queue. If that large list fails a match the system 100 asks a third party API such as Google Prediction API to make a best guess match. If the response from the third party API doesn't have a strong idea of which responder to fire, then the message is stored in a queue where it waits for the user to specify the appropriate responder that should be triggered and/or create a new responder. No matter what, the message is eventually removed from the queue (either because it was ignored, or a response was determined to be triggered).

Update Handler

The update handler takes care of general maintenance tasks.

Account Check

First thing it does is to check the user's account against the external server on a periodic basis. The check to the server verifies the user level, and user statistics such as monthly texts sent, and the monthly roll over time. First, the level is compared. If the server returns a level name beginning with Manual_, then the app goes into manual level mode, which simply defaults to what the server reports as the user's level.

Otherwise, the level that the App Store reports back from in-app billing is what is used, and the server is updated with that new data, if it does not match. Next, the roll over time is compared to make sure they match (the app defaults to the server, as long as it's not 0).

Then, it checks to see if it's time to roll the month over (if it's 30 days beyond the roll over time). Then for the monthly text count, the app takes whichever is largest (if the app has a larger count than the server, then the server is updated, otherwise, the app stores the server amount).

Sleep Time Maintenance

After checking the account (if needed), the handler then checks to see if the current time is within sleeping hours. If it is, then these checks are performed:

A. Check Counts

This scans all the databases for customer counts, to make sure the data is correct.

B. Check Groups Database

This checks the group database to make sure that all stored groups exist in the database. If they don't, it gets added. Then it checks to make sure there are no invalid, or unused tables in the database, and removes them. Finally, it makes sure that every contact in the groups database exists in the main database.

C. Check Log Files

This checks to see how many log files have been saved. If there are more than 10, they get zipped up into one file.

Text Count Update/SMS Deletion

These checks are done approximately every 4 hours (it will run when the app first opens, then every 4 hours after).

A. Text Count Update

If the app has sent 100 or more texts since the last update, then it sends the amount of texts sent since the last update. The server adds this to its total texts sent count.

B. SMS Deletion

If this is active (either delete by date, delete over a certain amount, or both), then the device's inbox is cleansed. The device's contacts are not deleted, unless the user has configured it in settings to do so.

Backup

The backup frequency is checked, and if it's due to backup again, it first checks to see how many backup files exist. If there are more than 9, the older ones are deleted. Then, the backup is performed. The update handler also contains methods to getting/updating the server for user information such as first/last name, business name, phone number, etc.

One Time Handler

This handler takes care of sending out user initiated mass text blasts. Like all handlers, this runs in its own thread spawned by the main service). First, it checks its internal list of numbers to be removed (in case opt-outs came in since the last interval), and removes them from the one time database (and list).

Next, if the one time database needs to be built, it does it at this point (this is only run when starting a new campaign, or when starting an old campaign after having shut the app down). Then, if it's within allowable texting hours, it picks a random number from the small list in memory (up to 200 items), and sends the one time message to that number, which then gets removed from the list, and the one time database.

Finally, if the list and database are empty, it sends a broadcast out to announce it's done, and shuts down the thread.

Queue Handler

The Queue handler aims to keep an eye on the incoming queue inside the Incoming handler. If the incoming handler is not active, and there are still entries in the incoming queue, then this handler attempts to process them.

Example User Interface

Referring to FIGS. 12-32, examples of user interface screens and associated functionality are shown and described. For example, the example user interface screens may be shown on a display of the mobile device 102 during different modes of operation. Accordingly, example input areas such as buttons, input fields, and tabs, and example output areas such as indicators, notifications, and confirmations, and the like, may be present on the user interface 202 of the mobile device 102 during the modes of operation.

The functions described in this section refer to the functions and like functions described and detailed in the above sections. In alternate implementations, additional, other, or equivalent user interface screens may be used to accomplish the described functionality.

Figure 12:
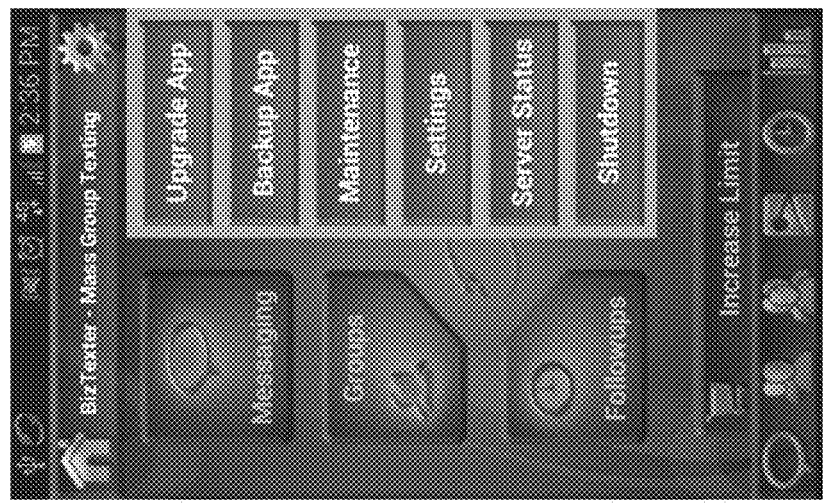

HEADER/FOOTER (See FIG. 12, for Example)

Most screens contain header and footer bars.

Header—

Home Button

Takes the user back to the main menu (inactive if main menu screen is active)

Settings Button

It opens another menu which is displayed on top of the current screen.

The six options that always show in this menu are:

Upgrade App

This allows the user to either verify their current license, or to purchase an upgrade.

Backup App

Will back-up the user's contact lists, and data to the SD card.

Maintenance

This brings up a dialog box with a selection of tasks the user can run to perform maintenance.

Settings

Brings the user to the app's Settings screen.

Server Status

This brings the user to a screen showing the status of the handlers (one time, timed follow ups, daily specials, etc.). If the Server Status screen is active, this option is hidden.

Shutdown

Shuts down the app and its services completely. A dialog box pops up asking for feedback before closing the app. It also acts as a confirmation to close the app.

The settings menu also has a few options added to it depending on which screen the user is currently on. Here are the other options which may appear as well as the screen they appear on:

Clear OneTime Queue

Deletes any of the current one time blast data. [Messaging]

Toggle Debug Mode

This puts the app into a debug mode.

The main difference is that the app will behave normally, but it will not send any texts out. Nevertheless, the app will behave as if it had.

The background on all screens gets changed to a gray gradient to make it obvious that debug mode is active. [Messaging]

Import CSV/VCF

This allows the user to import a CSV, or VCF file of contacts they have on their device. [Contacts Manager]

Export to CSV

Export the main contact database to a CSV file in external storage (usually the SD card). [Contacts Manager]

Harvest Mode

Takes the user to the option to disable or enable Harvest Mode.

[Responders]

Clear Timed DB

This will delete all contacts from the timed follow up database. [Follow ups]

Footer—

Messaging Button

Opens the Messaging screen.

Contacts Manager Button

This opens the Contacts Manager screen.

Group Manager Button

This opens the Group Manager screen.

Responder Button

This opens the Responders screen.

Follow ups Button

This opens the Follow ups screen.

Stats Button

This opens the Stats Menu screen.

Figure 13:
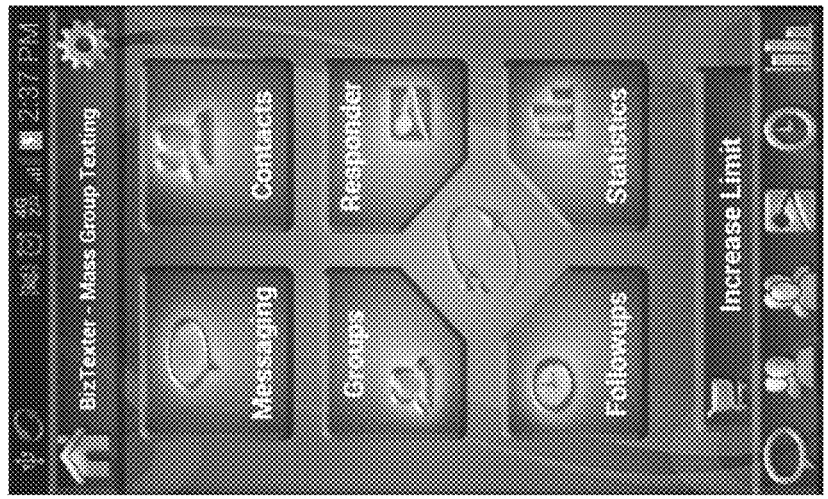

Main Menu (FIG. 13)

The main menu has big buttons for getting to the most used screens. There are four other buttons on this screen, which are under the bigger buttons (All buttons are encapsulated inside a scrollview). The buttons are:

Messaging Button

This opens the Messaging screen.

Contacts Manager Button

This opens the Contacts Manager screen.

Group Manager Button

This opens the Group Manager screen.

Responder Button

This opens the Responders screen.

Follow Ups Button

This opens the Follow ups screen.

Stats Button

This opens the Stats Menu screen.

Increase Limit Button

This allows the user to verify their current license, or upgrade

Watch Help Video Button

Links user to the 'Help Videos' on the business texter website.

Share This App

This brings up a list of applications the user can use to share how they feel about the app with others.

Send Feedback

Brings up a dialog box asking the user for their feedback. This is limited to 160 characters, as it is sent through an SMS.

Figure 14:
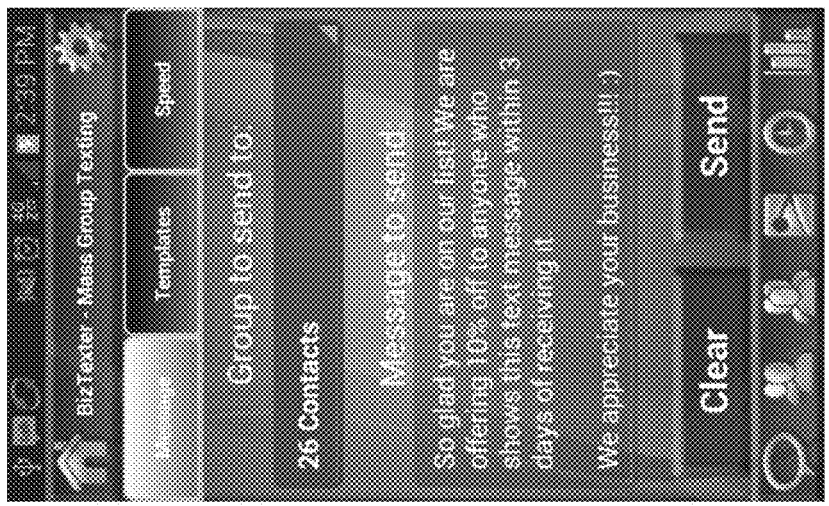

Text Messaging Screen (FIG. 14)

The Messaging screen contains three tabs:

Message—

This tab contains the area where the user can send a one-time mass text blast. When first opening, a dropdown allows the user to select the recipient group. After a group is selected, a dialog pops up, asking if the user would like to use a pre-made message template.

If they select Yes, then a list of templates is shown so the user can select which one they want to send. If either Yes or No are clicked, then the user sees a dialog asking if they'd like to narrow the group by area code.

When done, a TextBox will appear under the group dropdown, with either the selected template text, or keyboard will appear on screen, so the user can type their message.

There are two button under the TextBox:

Clear

This clears the current one time blast settings, and hides the Send and Clear Buttons, and the TextBox.

Send

When this is clicked, the system checks to make sure the message is of an appropriate length, and if it is, a dialog is displayed asking the user to confirm they want to send the blast. If the message isn't long enough, and message is displayed on screen informing the user.

When the send button is clicked, the system scans the live database to build the list of customers to text. This is stored in a separate database to minimize time accessing the live database. All processing is done in a separate thread.

Once the user clicks send, the app gives them a countdown timer which serves the purpose of letting them cancel the mass text in case it was initiated on accident or they have changed their mind. Once the countdown completes the app begins to iterate through the list sending messages to each customer one at time. During the sending process the app gives the user an indication of what phone number is currently being sent to and what the send count is. It also shows the number of customers remaining to be sent to. The user has the option of stopping the send blast or running it in the background so they can take care of other activities on the device. It also gives them an estimated time to completion given what speed they set the send rate to in the Advanced tab.

A separate database is created rather than attempting to load the whole list into memory. This separate database containing the dynamically created group can then be iterated through during the sending procedure. After each message is sent the system flags that number so if something interrupts the sending process or its paused for other reasons such as the user reached their sending limit and must upgrade their subscription level, the sending process can be restarted where it left off.

During the send process selects 200 customers at a time and randomly picks one from the 200 to send to. After sending it removes the phone number from the one the 200 list until there are none left. Then it removes the 200 from the one time queue and queues up another 200 from the one time queue and repeats.

Figure 15:
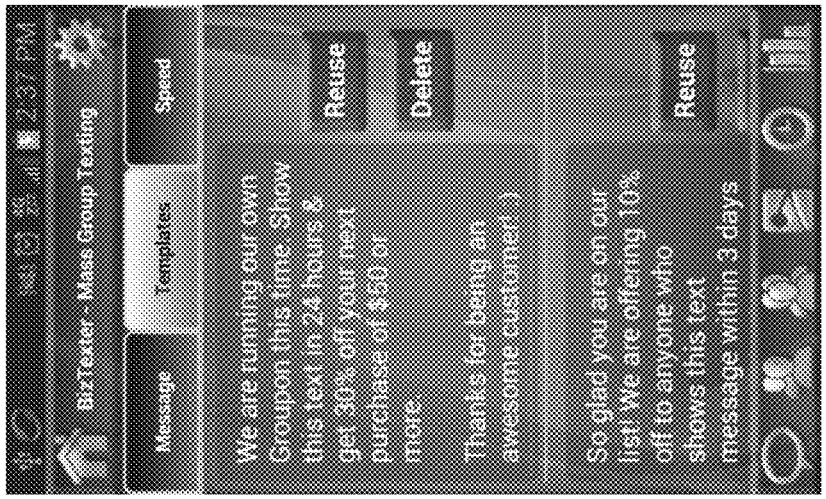

Templates (FIG. 15)

This tab contains a list of the pre-made message templates users can use to send mass text blasts. Each entry contains a TextBox with the message to send in it, and two buttons to the right of it.

Reuse

This starts the one time blast process in the Message tab, and sets the currently selected template as the message to send.

Delete

This allows the user to delete a saved template. A dialog box is displayed to confirm deletion of the selected template.

At the bottom of the list, there is another button:

Add New Template

When clicked, a dialog is displayed asking the user to type in their new message template.

Figure 16:
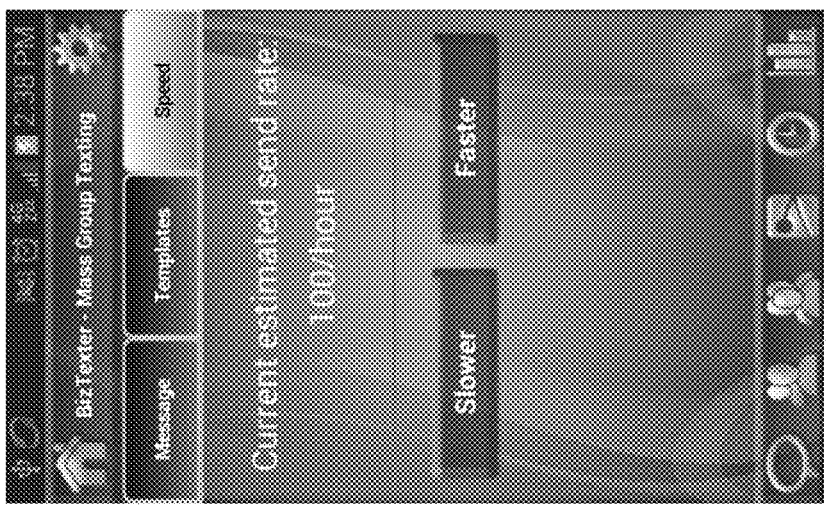

Advanced (FIG. 16)

This tab contains a label with the current estimated speed (in messages sent per hour), and two buttons:

Slower

This will slow the pace of messages sent out.

Faster

This will increase the pace of messages sent out.

The maximum speed is 5000/hour, and the minimum is 25/hour.

Narrow By Area Code:

The user configures a temporary group to send to by specifying which predefined groups to include and whether this new group should be further segmented using a search box. The user can specify an area code such as 509 in order to further reduce the size of the temporary group they are about to send a mass text to.

Manage Message Template Screen

There is a way to save and retrieve message templates.

Pick Button

There is a list picker button to allow an app user to reload a previously saved message template.

Template Name Text Box

There is a box for entering a name of the message to be saved. This allows user to find it again later using the Pick button.

Remove Button

The Remove button allows user to delete currently loaded message template. Upon clicking the Remove button user is presented with a confirmation popup box allowing user to confirm or cancel the deletion of the template.

Save Button

There is a Save button for the app user to save the currently loaded message as a template that can be retrieved later. When a user clicks the button the app checks to see that the template name box is not empty and not already saved. If the checks pass the app user is presented with a popup for confirming the save or canceling it. If the Confirm Save selection is chosen the template name and template message are saved.

Message Text Box

The box for entering the message to be sent or saved as a template also has a character counter label above it. The character counter turns red when the count reaches 160 characters or higher for SMS. For MMS the character counter turns red at 1,000.

Figure 17:
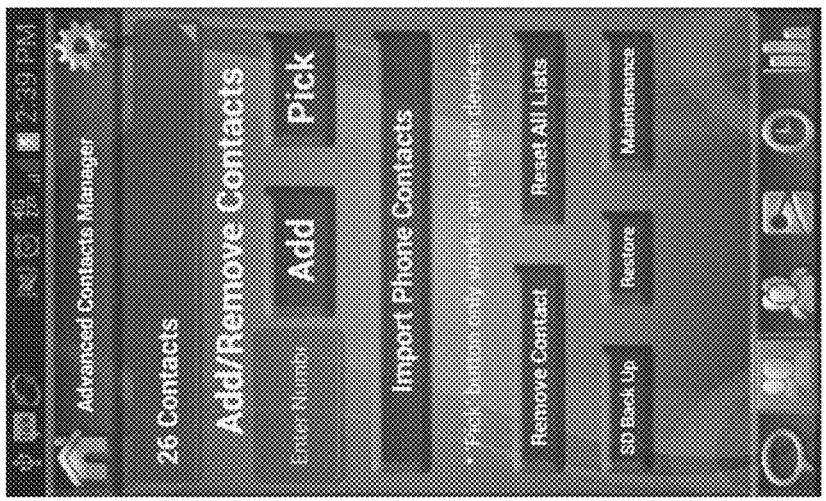

Contacts Manager Screen (FIG. 17)

The contacts manager screen allows the user to add, remove, import and export contacts. It also allows the user to backup the data associated with the app 212, and restore from a previous backup file.

Checkboxes

Each list of contacts has a checkbox next to it in order for the app user to select which list to activate so that their actions on this screen apply to the activated list. This may also appear as a dropdown list.

Add/Remove Text Box

There is a text box for manually typing in a phone number in order to allow the Add or Remove Contact buttons to function. This box can also accept CSV, CVF or other spreadsheet code.

Add Button

User can click the Add button in order to add whatever phone number is in the text box to whichever list is activated. If the Add/Remove Text Box contains a list of numbers or some other form of csv or spreadsheet code, the app formats the phone numbers into a storable list and then adds the numbers to the activated list. Additionally, when button is clicked, it checks if the number entered in the textbox is valid and if it is not in the database. If it isn't, the number gets added, otherwise, a message is displayed to the user letting them know the contact already exists.

Pick Button

The app user can click the Pick button in order to Import contacts in their phone stored outside the app. They are presented with a list of contacts. When the app user selects a contact, that contact's phone number is added to the Add/Remove Text Box. All special characters are removed and the phone number is formatted to prepare for adding to the active list. The app user can then click the Add button to save that number to the activated list.

Users can also search through the list of contacts and even use the "select all" feature during contact import process. Each contact that they had previously selected when doing a new contact import will appear with a check box pre-checked next to their name or phone number. This allows users to ignore previously added contacts when deciding which to add a-new.

Remove Contact Button

User can add a phone number to the Add/Remove Text Box manually or throughout the Pick button. Then the app user can click the Remove Contact button and the contacts phone number will be removed from all stored lists. This can be used as manual opt-out procedure.

Reset All Lists Button

User can reset all lists to zero. When user clicks Reset all contacts are deleted from the system and all list counts are changed to zero. In an implementation, this deletes contacts from the system, but all other user data is preserved.

SD Backup Button

User can save all lists and user preferences to either onboard memory or and SD Card. It defaults to the SD Card if available. User may also be given the option of using cloud storage backup.

Restore Button

When user clicks Restore a list of files on the device are presented. The app user can then navigate to the folder containing the previously backed up file. When user clicks the backup file the app restores all lists and user preferences.

Process Button

When user long presses the Process button the system checks the database and refreshes all stats, lists and list counts.

Maintenance

This brings up the same maintenance options as those available from the header bar's settings menu.

The contacts manager screen (in an alternate embodiment) contains three tabs:

Responders (FIG. 14)

This tab allows the user to manage contacts in all responder groups.

Group To Edit Section

Group Picker

A drop down listing all of the system's responder groups. The user selects which group they would like to edit.

Import From Section

Device

This allows the user to import any amount of contacts from the device's contacts.

CSV/VCF

This allows the user to import from a CSV/VCF file on their device.

Manual Entry Section

Entry TextBox

This TextBox is where the user enters the number they'd like added, or removed.

Add/Remove Dropdown

When the user is done entering the number, they select if they want to add it, or remove it using this dropdown.

Custom

This tab is the same as the Responders tab. The only difference is the groups that are displayed in the group picker only show custom groups the user has added.

Tools

Backup App

When clicked, the user's contact databases, and data are backed up to external storage (usually the SD card).

Restore from Backup

This is used to restore a previous backup file.

Export To CSV

This exports the contact database to a CSV file in external storage.

Maintenance

This opens up the maintenance dialog to run tasks.

Reset All Lists

This deletes all contacts from all lists in the app. The user's data is retained.

Figure 18:
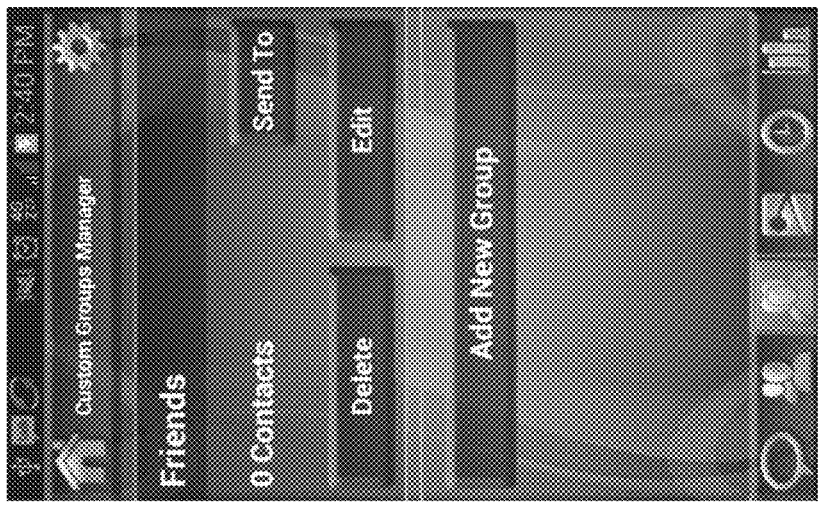

Group Manager Screen (FIG. 18)

This screen lists the user created groups.

Group Section:

Each group has its title listed in the top on the group section. A label is underneath that which displays the amount of contacts in the group.

SendTo

When clicked, the Messaging screen is opened, with this group as the selected recipients of the blast.

Delete

Deletes the group (user is given a dialog to confirm deletion).

Edit

Opens the Group Edit Screen to edit the group.

Add New Group

Figure 19:
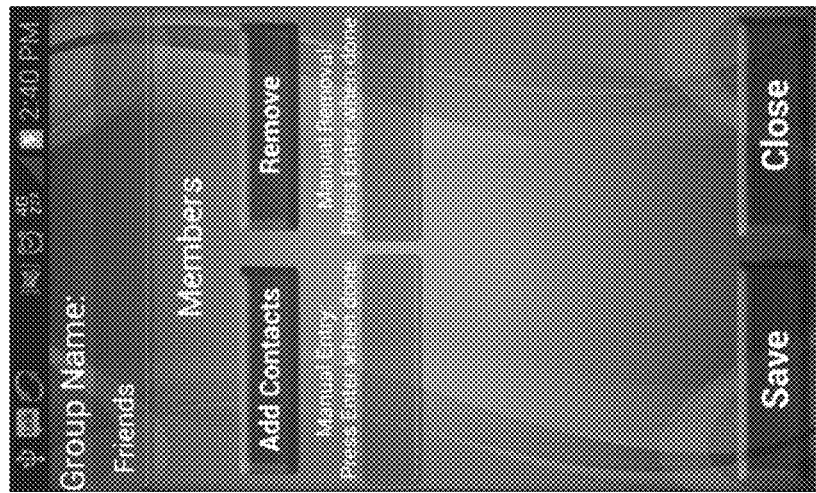

This allows the user to create a new group. When clicked, a dialog is displayed asking for the name of the new group. If the name passes all checks (such as ensuring it's an appropriate length, and that it doesn't already exist), the Group Edit Screen is shown Group Edit Screen (FIG. 19)

A Textbox at the top of the screen displays the group name (and can be changed here as well).

Add Contacts

This will allow the user to import and select contacts from the device's contacts.

Remove

This will bring up a picker to remove numbers from this group. User is given the option to remove from this group only, or to remove from the main database (if the number exists in another group, then the number is NOT removed).

There are two TextBoxes underneath the above two boxes for manually adding, or removing contacts from the group. A label below these Textboxes displays the contacts, and their names, if applicable.

Save

This saves the group, and closes this screen, returning to the Group Manager screen.

Close

This will close this screen, and return to the Group Manager screen.

Technical Explanation:

Groups are a simple data base flag in the customer database for each customer (identified by their phone number). A user can belong to any number of groups. Like the responder level lists, the groups are generated dynamically.

Database

"Groups" consist of responder groups, as well as custom groups. All groups are stored in a database separate from the main database. The group name is used as the table name within the database. The phone number and contact name are stored in this database (if the contact name is available, if the contacts were imported from the device). Before any number can be added to this database, it must first exist in the main database.

Data

Custom user created groups (created in the group manager screen) use the serialized GroupData class to store it's information. The data stored is:

The name of the group

The count of messages sent to this group

The count of contacts in this group

Responders Screen (FIG. 20)

User can create automatic responses that are sent when the system detects incoming text messages. There is a list of auto responses labeled with their names as the text. There is an activate checkbox, a Show text box, a Keyword text box and a Message text box.

The responders screen has 3 tabs contained within:

Main (FIG. 20)

This contains the 3 core responders in the app. New Contacts, Responded Once, and Responded Twice are among the responders in this tab.

Activate Response

This checkbox controls if the system sends a response when this responder is triggered.

Edit

This opens up the Responder Edit Screen to edit this response.

Help/Info

Each of the 3 core responders have an info button that can be pressed to explain how each responder works.

Standard (FIG. 21)

These are responders that come pre-loaded in the app. They cannot be deleted, but can be edited. Each responder has its title, and a small description listed underneath.

Activate Response

When checked, the system will send the specified message when this responder is triggered.

Edit

This opens up the Responder Edit Screen to edit this response.

Help/Info

This brings up more information about this particular responder.

Figure 22:
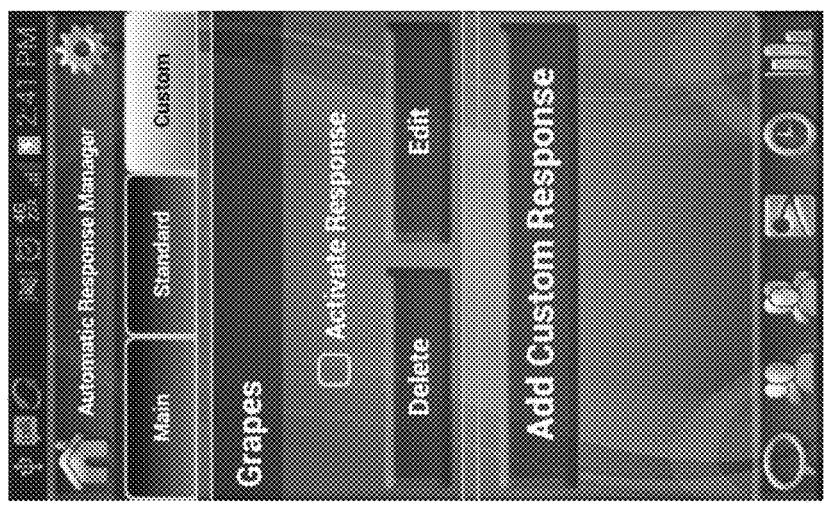

Custom (FIG. 22)

This is where the customer can add and remove their own custom responders.

Add Custom Response

This brings up a dialog asking the user for the name of the group. The Responder edit screen is opened after the name is entered.

Activate Response

When checked, the system will send the specified message when this responder is triggered.

Edit

This opens up the Responder Edit Screen to edit this response.

Delete

Deletes the responder, after user has confirmed deletion.

Figure 23:
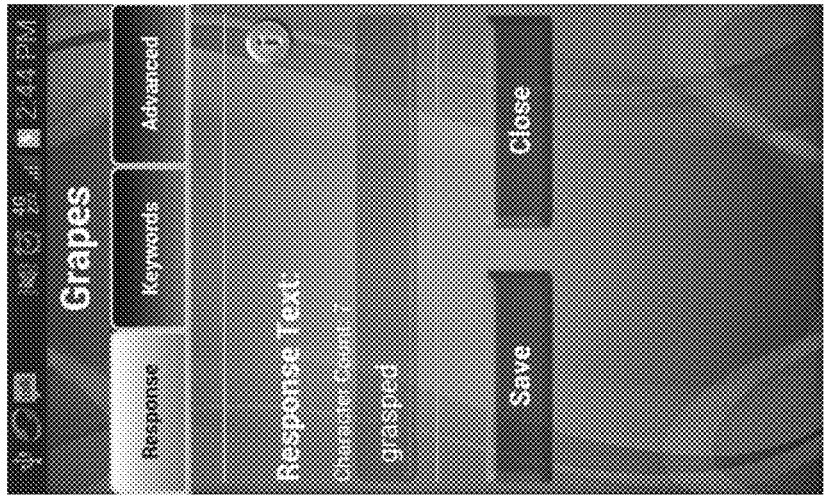

Responder Edit Screen (FIG. 23)

This screen has 3 tabs to edit all the information in a responder.

Response (FIG. 23)

Response TextBox

User can enter the message that is to be sent when the auto response is triggered by an incoming message. There is a character counter just like the Text Messaging Screen.

Figures 24, 25:
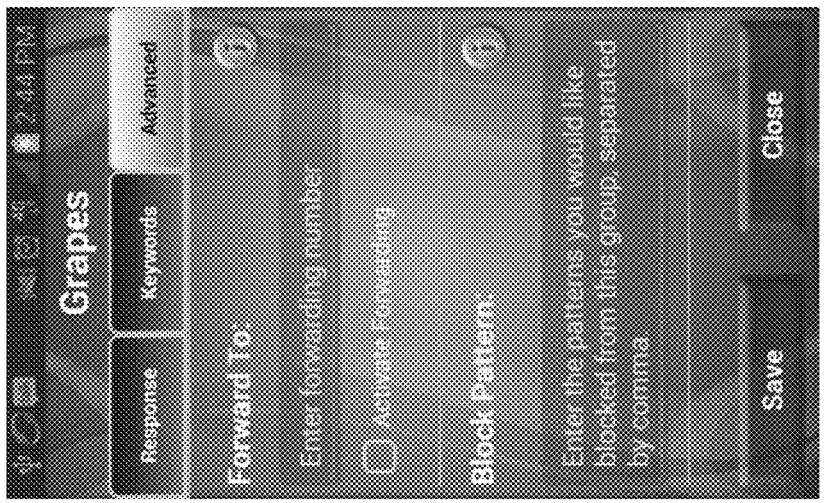

Keywords (FIG. 24)

Keywords TextBox

User can specify a list of keywords or keyword phrases that will trigger the auto response. The list is separated by commas to allow the system to know they are to be segmented.

Block Keywords TextBox

The user enters keywords here that block this responder from triggering.

Advanced (FIG. 25)

Forward To TextBox

This enters the phone number to forward this response to.

Activate Forwarding

This turns forwarding on/off.

Block Pattern TextBox

This allows the user to set patterns in the incoming text message to block this responder from triggering. Response Priority Index (only seen when editing a custom responder).

Move Up

User can decrease the listed position of a specific auto response and thereby decreasing its order of priority.

Move Down

User can move a specific auto response up in the list of auto responses. This causes the important of the auto response to increase as the keywords contained therein will be evaluated against the incoming text message before auto responses listed below it. This may appear as a numerical digit indicating the index priority, meaning what position the responder should be in the order of all responders.

Save

Save this responder. This does not exit the edit screen.

Close

Close the responder edit screen, and return to the Responders screen. If data has changed, the user is asked if they'd like to save their changes.

Figure 26:
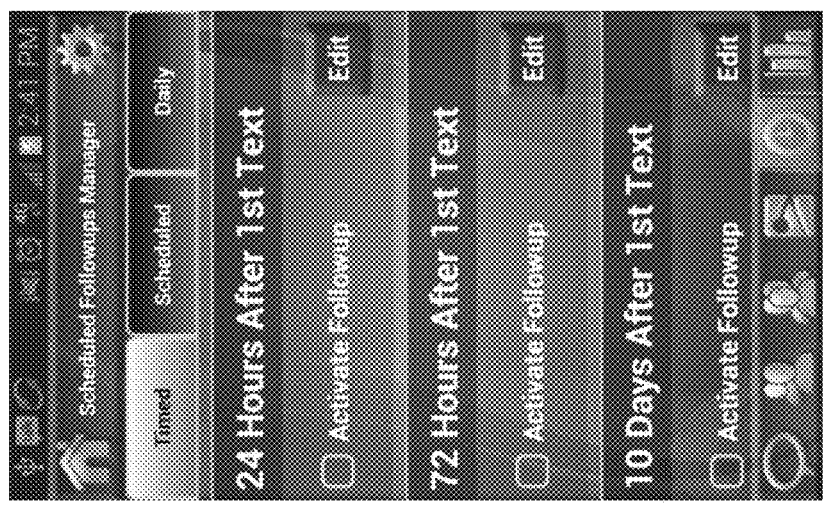

Follow Ups Screen (FIG. 26)

User can setup follow up messages that will be sent to subscribers in a timed sequential basis. Each has a label such as 24 hours After 1st Text, 48 hours After 1st Text, 10 days After 1st Text, etc.

This screen also has 3 tabs to organize the different Follow up types:

Timed Follow Ups (FIG. 26)

These are sequential follow-ups which are sent after a designated amount of time from when the contact first texted into the system (24 hours, 72 hours, 10 days, etc.). These follow-ups cannot be deleted, or added to by the user.

Activate Follow Up

This checkbox controls whether this follow-up is enabled.

Edit

Opens the Follow up Edit Screen.

Faster

This will increase the frequency it sends out the timed follow-ups.

Slower

This will decrease the frequency it sends out timed follow-ups.

Technical Explanation of Timed Follow-Ups

Data

The data for timed follow-ups are stored independently in preferences. This will eventually be changed to use the FollowupStore class.

Data Stored:

If the follow-up is active

The message to send

The count of messages sent

Handler

The timed follow-up handler has its own database as well. Contacts get added to this database when a new contact texts into the system (if contacts are imported, they do not get added to this database). When a contact is first added, their number is added, along with the time they first texted in, and an integer representing the last follow-up sent. When building the list of contacts to send to, it checks for people who first texted within the amount of time of the follow-up, and if that follow-up was sent or not. When a follow-up is sent, the database is updated with the integer representing the follow-up sent. If the last follow up sent was the 180-day follow up, the contact is removed from the timed follow-up database.

Figure 27:
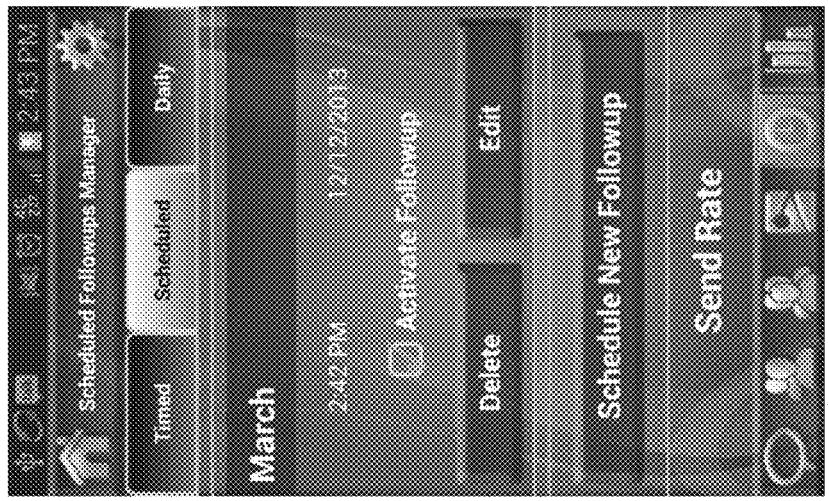

Scheduled Follow Ups (FIG. 27)

This screen allows the user to schedule a text blast at a specific time in the future.

Scheduled Follow-Up Section

The time and date this follow up is set for are shown in here, above the activate checkbox.

Activate Follow Up

Turn this scheduled follow up off/on.

Delete

Delete this scheduled follow up (user is prompted with a confirmation dialog).

Edit

Opens the Follow up Edit screen to edit this follow up.

Schedule New Follow Up

When clicked, the user is asked for a title of the new follow up. After complete, the Follow up Edit Screen is displayed.

Faster

Increase the frequency the scheduled follow-ups are sent.

Slower

Decrease the frequency the scheduled follow-ups are sent.

Technical Explanation of Follow-Ups

Data

Data for scheduled follow-ups use the serialized FollowupStore class to store its information.

The info stored in this class is:

The name of the follow-up

The message to sent

The contact phone to send to

The contact name to send to if the follow-up is active

The count of times this follow-up has been sent

The sendTime to send the follow up in milliseconds

The date to send the follow-up

The time of day to send the follow-up

An integer to represent who to send to (like how daily specials are handled)

The group name to send to

If the follow-up was completed.

Handler

This handler also has its own database to handle its processing. When a scheduled follow-up is determined to be eligible to be sent, the database is built. The contacts are pulled from the main database if the group integer is 0-2, otherwise they will be pulled from the groups database, using the group name to specify which table to pull from. Similar to the daily follow-ups, a smaller list of up to 250 contacts is pulled from the handler's database. If the count is less than 250, the follow-up is marked as completed, so that the database doesn't end up rebuilding again. When the follow-up is sent to a contact, that number gets removed from the list, and also from the current scheduled follow-up database.

Figure 28:
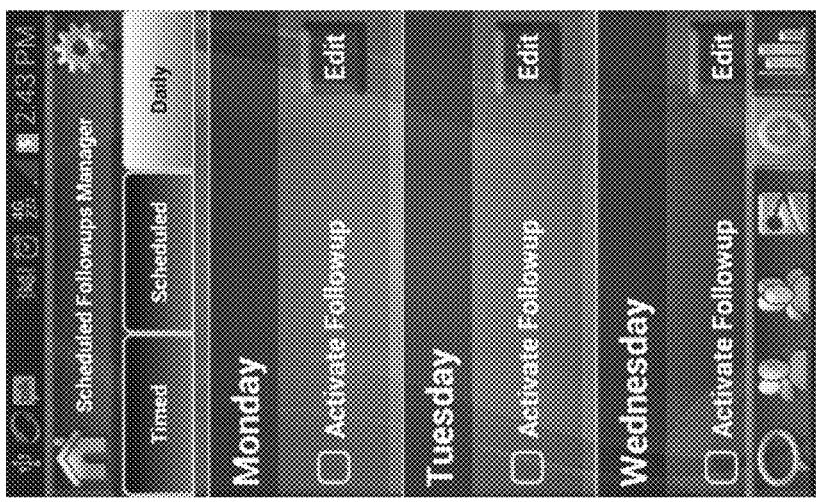

Daily Messages (FIG. 28)

Daily follow-ups (also known as daily or weekly specials) are shown in this tab. Like timed follow-ups, these cannot be added to, or removed by the user. All 7 days of the week are represented here.

Activate Follow Up

Turns this daily follow up on/off

Edit

Edit this follow-up in the Follow up Edit Screen.

Faster

Increases the frequency the daily follow-ups are sent.

Slower

Decreases the frequency the daily follow-ups are sent.

Technical Explanation of Daily/Weekly Messages

Users can schedule messages to be sent to a contacts group on specific days of the week. There is a list of each day of the week, Monday Special, Tuesday Special, etc.

Data

Daily specials use the serialized SpecialStore class to store its information. The info tracked is:

If the special is activated

Which group to send the special to

An integer representation of which group to send to (if the int is 0-2, then it is to be sent to one of the main 3 categories of new contacts, responded once, or responded twice, over 2, and it uses the group name)

The message to send

The count of times the message has been sent out.

Handler

The daily special handler has its own database to process its messages. This database is built on a daily basis. It pulls the contacts from the main database if the group to send to is new contacts, responded once, or responded twice. Otherwise the contacts are pulled from the groups database. If the current day is active, then it loads a small list of up to 250 numbers from its newly built database. Daily specials are then processed from this list. After a message is sent, that number is then removed from the list, and the database. When the current list runs out of messages, it loads up to 250 from the database again. If no more are found, the handler will go into a sleep mode.

Figure 29:
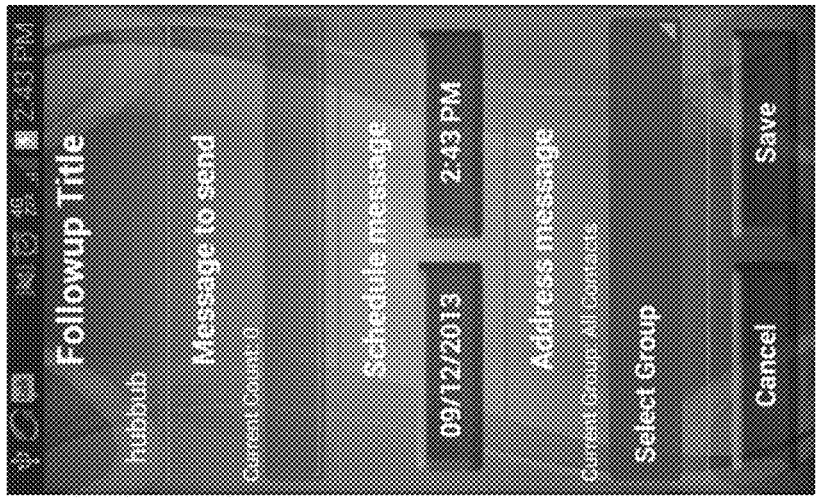

Follow Up Edit Screen (FIG. 29)

This screen changes depending on what type of Follow up the user is editing.

Message TextBox [all Follow-Ups]

The message to send for this follow-up can be edited here.

Follow Up Title TextBox [Scheduled Follow-Up]

This allows the user to change the name of this follow up.

Time Picker [Scheduled Follow-Up]

This sets the time of day the follow-up should start sending.

Date Picker [Scheduled Follow-Up]

This sets the day to send the follow-up.

Selection Picker [Scheduled, and Daily Follow-Up]

The user can pick from one of three options; Select a group, select device contact or Manual.

A. Select Group

The user is presented with a list of the available groups to send to.

B. Select Device Contact

The user can select an individual contact from their device to send to.

C. Manual

If manual is chosen, a Textbox appears so the user can enter the phone number to send to manually. There is a Done button to the right for the user to press when they are done entering the number.

Cancel

Cancel editing this follow up, and return to the Follow-ups Screen without saving.

Save

Save this follow-up. When save is complete, user is returned to the Follow-up Screen.

Figures 30, 31:
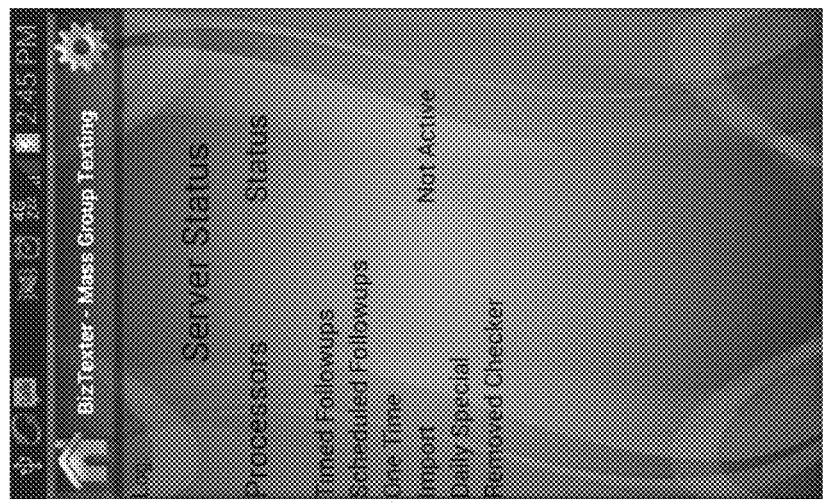

Stats Menu (FIG. 30)

This screen displays stats for customer counts, and sent counts for each group.

Refresh

This will refresh stats. If long pressed, a more thorough scan is made to update the stats.

Log

Opens the Log screen.

Stats Label

This is where the stats are displayed to the user.

Contacts

The stats shown when this button is pressed are:

Number of total contacts, and number of removed

Number of responded once contacts, and the number removed

Number of responded twice contacts, and the number removed

How many one time messages are waiting to be sent

The monthly text limit

Number of texts sent this month

The total number of texts sent.

Groups

This shows the contact and sent count for all other responder groups, and user created custom groups.

Weekly

Shows how many texts were sent for each weekly follow up.

Follow-ups

Shows how many texts each follow-up has sent. This includes timed, and scheduled follow-ups.

Log Screen

The app logs a lot of processes as it works, and this allows the user to see when things are happening (texts being sent, received, what the system did with them, errors, etc.).

Refresh

Refreshes the log label with the latest log entries.

Clear Log

Clears all log entries.

Log Label

This is where all log entries are displayed in a scrolling window. Each entry is time stamped.

Server Status Screen (FIG. 31)

This screen shows the status of the background processors. The processors shown are:

Timed Follow up Handler

Scheduled Follow up Handler

One Time Handler

Import

Daily Special Handler

Removed Checker

The possibilities are—Idle (the processor is "alive", but not doing anything), Sleeping (the processor is inactive. This is similar to Idle, but when sleeping, the processor is on a much longer delay), Not Active (the processor isn't in use, or even active in any way), and Running (the processor is alive, and actively running a task).

Figure 32:
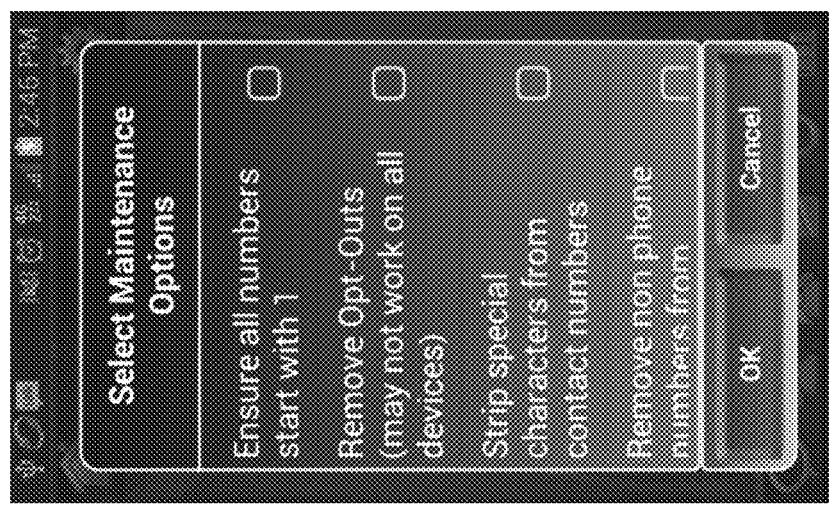

Maintenance Dialog (FIG. 32)

This dialog allows the user to manually run a set of maintenance tasks.

I. Ensure all numbers start with 1

This scans the main database to ensure all the contacts begin with 1.

II. Remove Opt-Outs

This scans the device's SMS thread for any opt outs the system may have missed.

III. Strip special characters from contact numbers.

All numbers in the main database are stripped of any special characters.

IV. Remove Non-Phone Numbers from Database.

Removes any entry that is not a phone number.

V. Remove Duplicates from the Main Database.

VI. Rebuild Timed Follow-Up Database (will be removed in the future).

VII. Ensure Group Tables Exist

This makes sure all the group names in the app exist in the group database. If not, they are created.

As discussed above, the techniques, components, and devices described herein with respect to the implementations are not limited to the illustrations of FIGS. 1-32, and may be applied to other mobile communication devices, and designs, without departing from the scope of the disclosure. In some cases, additional or alternative components, techniques, sequences, or processes may be used to implement the techniques described herein. Further, the components and/or techniques may be arranged and/or combined in various combinations, while resulting in similar or approximately identical results. It is to be understood that a communication system 100 and or a mobile device 102 may be implemented as a stand-alone device or as part of another system (e.g., integrated with other components, systems, etc.). In various implementations, additional or alternative components may be used to accomplish the disclosed techniques and arrangements.

Conclusion

While various discreet embodiments have been described throughout, the individual features of the various embodiments may be combined to form other embodiments not specifically described. The embodiments formed by combining the features of described embodiments are also within the scope of the disclosure.

What is claimed is:

1. A system for communicating with a plurality of mobile devices from a single mobile device, the system comprising:
   a processor of the single mobile device;
   a memory coupled to the processor;
   a mobile application component including processor-executable instructions stored in the memory and operable on the processor to:
   associate each mobile device of the plurality of mobile devices to at least one of a plurality of groups stored in the memory of the single mobile device, according to a user-defined rule associated with the plurality of groups;
   receive an incoming message including a natural language message from another mobile device and store source information of the another mobile device to a corresponding group, based on a content of the incoming message;
   select an outgoing message from a plurality of outgoing messages stored in the memory of the single mobile device for each of the plurality of groups; and
   automatically send a communication including a corresponding outgoing message from the single mobile device to a corresponding group of mobile devices, based on a predetermined time duration since sending a previous communication.

2. The system of claim 1, wherein the processor-executable instructions are operable on the processor to store the source information of the another mobile device to the corresponding group based on a keyword included in the incoming message.

3. The system of claim 1, wherein the processor-executable instructions are operable on the processor to automatically send the communication including the corresponding outgoing message based on the occurrence of a predetermined day.

4. The system of claim 1, further comprising an administrative component stored in the memory and operable on the processor to allow a user to determine and/or adjust one or more groups, the plurality of outgoing messages, and/or one or more user-defined rules.

5. The system of claim 1, wherein the processor-executable instructions are operable on the processor to exclude the another mobile device from communications sent from the single mobile device, based on the content of the incoming message.

6. The system of claim 5, wherein the processor-executable instructions are operable on the processor to remove the source information of the another mobile device from the memory of the single mobile device when the content of the incoming message indicates an opt-out request.

7. The system of claim 1, wherein the processor-executable instructions are operable on the processor to:
receive the natural language message including a plurality of words;
compare one or more words of the plurality of words to either a small data list or a medium data list, the small data list including a plurality of keywords and the medium data list including a plurality of key value pairs;
in response to the natural language message including a word that matches one or more keywords of the small data list, match the natural language message to a function, wherein the word includes a first character length that is within a configurable number of characters of a keyword length;
in response to the natural language message including a paired value of a key value pair in the medium data list, match the natural language message to a label of the key value pair, wherein the paired value includes a second character length that is within a configurable number of characters of a paired value length;
receive a plurality of message variations, the plurality of message variations based on a response scenario corresponding to the natural language message, each of the message variations including a plurality of response words; and
automatically send another communication from the single mobile device to the plurality of mobile devices, the communication including the response scenario corresponding to the natural language message.

8. A smartphone device, comprising:
a memory configure to store information associated with a plurality of mobile devices, and a plurality of outgoing messages associated with a plurality of contact groups; and
a processor programmed to execute an algorithm including:
associating each mobile device of the plurality of mobile devices to at least one of the plurality of contact groups stored in the memory, according to user-defined rules associated with the plurality of contact groups;
receiving an incoming message including a natural language message from another mobile device including source information and assigning the source information of the another mobile device to a contact group from the plurality of contact groups based on content of the incoming message;
selecting an outgoing message from the plurality of outgoing messages stored in the memory for each of the plurality of contact groups; and
automatically sending a communication including a corresponding outgoing message from the smartphone device to a corresponding group of mobile devices, based on a predetermined time duration since sending a previous communication.

9. The smartphone device of claim 8, wherein the processor is programmed to execute the algorithm including assigning the source information of the another mobile device to the contact group based on a keyword included in the incoming message.

10. The smartphone device of claim 8, wherein the processor is programmed to execute the algorithm including automatically send the communication including the corresponding outgoing message based on the occurrence of a predetermined day.

11. The smartphone device of claim 8, wherein the processor is programmed to execute the algorithm including displaying a user interface screen to allow a user to determine and/or adjust one or more groups, the plurality of outgoing messages, and/or one or more user-defined rules.

12. The smartphone device of claim 8, wherein the processor is programmed to execute the algorithm including excluding the another mobile device from communications sent from the smartphone device, based on the content of the incoming message.

13. The smartphone device of claim 12, wherein the processor is programmed to execute the algorithm including removing the source information of the another mobile device from the memory of the smartphone device when the content of the incoming message indicates an opt-out request.

14. The smartphone device of claim 8, wherein the processor is programmed to execute the algorithm including:
receiving the natural language message including a plurality of words;
comparing one or more words of the plurality of words to either a small data list or a medium data list, the small data list including a plurality of keywords and the medium data list including a plurality of key value pairs;
in response to the natural language message including a word that matches one or more keywords of the small data list, matching the natural language message to a function, wherein the word includes a first character length that is within a configurable number of characters of a keyword length;
in response to the natural language message including a paired value of a key value pair in the medium data list, matching the natural language message to a label of the key value pair, wherein the paired value includes a second character length that is within a configurable number of characters of a paired value length;
receiving a plurality of message variations, the plurality of message variations based on a response scenario corresponding to the natural language message, each of the message variations including a plurality of response words; and
automatically sending another communication from the smartphone device to the plurality of mobile devices, the communication including the response scenario corresponding to the natural language message.

15. A non-transitory computer-readable storage media having computer-executable instructions embodied thereon, when executed by a processor of a smartphone device the computer-executable instructions cause the processor to perform steps of an algorithm including:
associating a plurality of mobile devices to a plurality of contact groups stored in memory according to user-defined rules associated with the plurality of contact groups;
associating the plurality of contact groups with a plurality of outgoing messages stored in memory;
receiving an incoming message including a natural language message from another mobile device including source information and assigning the source information of the another mobile device to a contact group from the plurality of contact groups based on content of the incoming message;

selecting an outgoing message from the plurality of outgoing messages stored in the memory for each of the plurality of contact groups; and automatically sending a communication including a corresponding outgoing message from the smartphone device to a corresponding group of mobile devices, based on a predetermined time duration since sending a previous communication.

16. The non-transitory computer-readable storage media of claim 15, wherein the computer-executable instructions cause the processor of the smartphone device to perform steps of the algorithm including assigning the source information of the another mobile device to the contact group based on a keyword included in the incoming message.

17. The non-transitory computer-readable storage media of claim 15, wherein the computer-executable instructions cause the processor of the smartphone device to perform steps of the algorithm including automatically send the communication including the corresponding outgoing message based on the occurrence of a predetermined day.

18. The non-transitory computer-readable storage media of claim 15, wherein the computer-executable instructions cause the processor of the smartphone device to perform steps of the algorithm including displaying a user interface screen to allow a user to determine and/or adjust one or more groups, the plurality of outgoing messages, and/or one or more user-defined rules.

19. The non-transitory computer-readable storage media of claim 15, wherein the computer-executable instructions cause the processor of the smartphone device to perform steps of the algorithm including excluding the another mobile device from communications sent from the smartphone device, based on the content of the incoming message.

20. The non-transitory computer-readable storage media of claim 15, wherein the computer-executable instructions cause the processor of the smartphone device to perform steps of the algorithm including:

receiving the natural language message including a plurality of words;

comparing one or more words of the plurality of words to either a small data list or a medium data list, the small data list including a plurality of keywords and the medium data list including a plurality of key value pairs;

in response to the natural language message including a word that matches one or more keywords of the small data list, matching the natural language message to a function, wherein the word includes a first character length that is within a configurable number of characters of a keyword length;

in response to the natural language message including a paired value of a key value pair in the medium data list, matching the natural language message to a label of the key value pair, wherein the paired value includes a second character length that is within a configurable number of characters of a paired value length;

receiving a plurality of message variations, the plurality of message variations based on a response scenario corresponding to the natural language message, each of the message variations including a plurality of response words; and automatically sending another communication from the smartphone device to the plurality of mobile devices, the communication including the response scenario corresponding to the natural language message.

* * * * *